(12) United States Patent
Yang et al.

(10) Patent No.: US 8,856,028 B2
(45) Date of Patent: Oct. 7, 2014

(54) INVENTORY ALLOCATION FOR ADVERTISING WITH CHANGEABLE SUPPLY LANDSCAPE

(75) Inventors: Jian Yang, Palo Alto, CA (US); Jianchang Mao, San Jose, CA (US)

(73) Assignee: Yahoo! Inc., Sunnyvale, CA (US)

(*) Notice: Subject to any disclaimer, the term of this patent is extended or adjusted under 35 U.S.C. 154(b) by 551 days.

(21) Appl. No.: 13/012,655

(22) Filed: Jan. 24, 2011

(65) Prior Publication Data
US 2012/0191541 A1 Jul. 26, 2012

(51) Int. Cl.
*G06Q 30/00* (2012.01)
*G06Q 30/02* (2012.01)

(52) U.S. Cl.
CPC ........ G06Q 30/0244 (2013.01); *G06Q 30/0241* (2013.01); *G06Q 30/0245* (2013.01); *G06Q 30/0251* (2013.01); *G06Q 30/0277* (2013.01)
USPC .................... 705/14.43; 705/14.4; 705/14.45; 705/14.49; 705/14.73

(58) Field of Classification Search
USPC ............. 705/14.4, 14.43, 14.49, 14.45, 14.73
See application file for complete search history.

(56) References Cited

U.S. PATENT DOCUMENTS

| | | | | |
|---|---|---|---|---|
| 7,689,432 B2 * | 3/2010 | Gross | | 705/14.73 |
| 8,392,248 B2 * | 3/2013 | Cosman | | 705/14.4 |
| 2007/0244675 A1 * | 10/2007 | Shai et al. | | 703/2 |
| 2010/0082392 A1 * | 4/2010 | Yang et al. | | 705/8 |
| 2010/0082399 A1 * | 4/2010 | Ghosh et al. | | 705/10 |
| 2012/0166259 A1 * | 6/2012 | Ma et al. | | 705/14.4 |

* cited by examiner

*Primary Examiner* — James W Myhre
*Assistant Examiner* — Michael Goldman
(74) *Attorney, Agent, or Firm* — Brinks Gilson & Lione

(57) ABSTRACT

An advertisement impression distribution system is programmed to generate an allocation plan for serving a number of advertisement impressions changeable as a result of one or more events, the allocation plan to allocate a first portion of advertisement impressions to satisfy guaranteed demand and a second portion of advertisement impressions to satisfy non-guaranteed demand. The system includes an optimizer programmed to establish a relationship between the first portion of advertisement impressions and the second portion of advertisement impressions, the relationship defining a range of possible proportions of allocation of the first portion of advertisement impressions and the second portion of advertisement impressions; and to impose at least one objective on the relationship including moderating an increase in the number of advertisement impressions available for allocation to the first and second portions, to minimize a cost associated with reducing a quality of the advertisement impressions as their volume increases. The system outputs the allocation plan to an ad serving module to control serving of the advertisement impressions according to the range of possible proportions of allocation between the first and the second portions.

20 Claims, 8 Drawing Sheets

INVENTORY ALLOCATION FOR ADVERTISING WITH CHANGEABLE SUPPLY LANDSCAPE

CROSS-REFERENCE TO RELATED APPLICATIONS

This application is related to, but does not claim the priority benefit of, commonly-assigned U.S. patent application Ser. No. 12/609,396, filed Oct. 30, 2008, now U.S. Pat. No. 8,311,884, issued Nov. 13, 2012, which is a continuation-in-part of U.S. patent application Ser. No. 12/241,657, filed Sep. 30, 2008, the entirety of both of which are incorporated by reference herein.

TECHNICAL FIELD

The present description relates generally to systems and methods for providing a display advertising optimization model including balancing objectives such as: minimizing a supply cost of ad impressions, maximizing guaranteed demand representativeness, maximizing non-guaranteed revenue, and minimizing under-delivery penalties.

BACKGROUND

A market exists for the distribution of advertising and other information over data communications and entertainment networks. A non-limiting example is insertion of advertising copy supplied by advertisers for appearance on web pages having content offered by media distributors such as news and information services, internet service providers, and suppliers of products related to the products or services of the advertiser.

The value of an opportunity to present an ad (i.e., to exploit an "ad impression") is different for different advertisers and different web page or entertainment genres, because the content of the media delivered by a particular media outlet draws users of a certain type that may correlate more or less strongly with a population of potential customers that an advertiser seeks to reach. Variation in the value of ads, the ability to discriminate among ad recipients as a function of the variable content of the web pages they access, and the ability to shift selectively to route appropriate ad content to a selected user when a web page is rendered all make on-line network communications a useful and efficient environment for advertising, and especially for targeted advertising.

The network could be the Worldwide Web, and the advertising copy could comprise banner ads, graphics in fields of specific size and placement, overlaid moving pictures or animation, redirection to a different URL, etc. The same targeting abilities also are applicable to networks that are interactive to a lesser degree, such as cable television ad insertion, which might be done at a head end or at a hub, or even from a subscriber-specific set top box.

Accordingly, ad impressions may be delivered in a manner to target characteristics (or attributes) of users or web page content—referred to as representativeness—with the goal to fairly represent the targeted characteristics in delivered impressions. When advertisers pay in advance by way of contract for a specific number of ad impressions, they desire a certain quality of representativeness, which creates what is termed guaranteed demand (GD). Normally, ad impressions are first served to satisfy GD contracts. Ad impressions may also be auctioned via an ad exchange on an ad hoc spot market when the ad impressions exceed projected guaranteed demands or are more profitably auctioned, which creates non-guaranteed demand (NGD). Availability of NGD ad impressions is generally resolved immediately before advertisement delivery in real time.

Optimizing a balance between meeting the guaranteed (GD) demand in a representative way that best targets user characteristics with a desire to increase NGD revenue and minimize penalties associated with under-delivery of GD ad impressions can be achieved through programmable modeling.

BRIEF DESCRIPTION OF THE DRAWINGS

The system and/or method may be better understood with reference to the following drawings and description. Non-limiting and non-exhaustive descriptions are provided with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
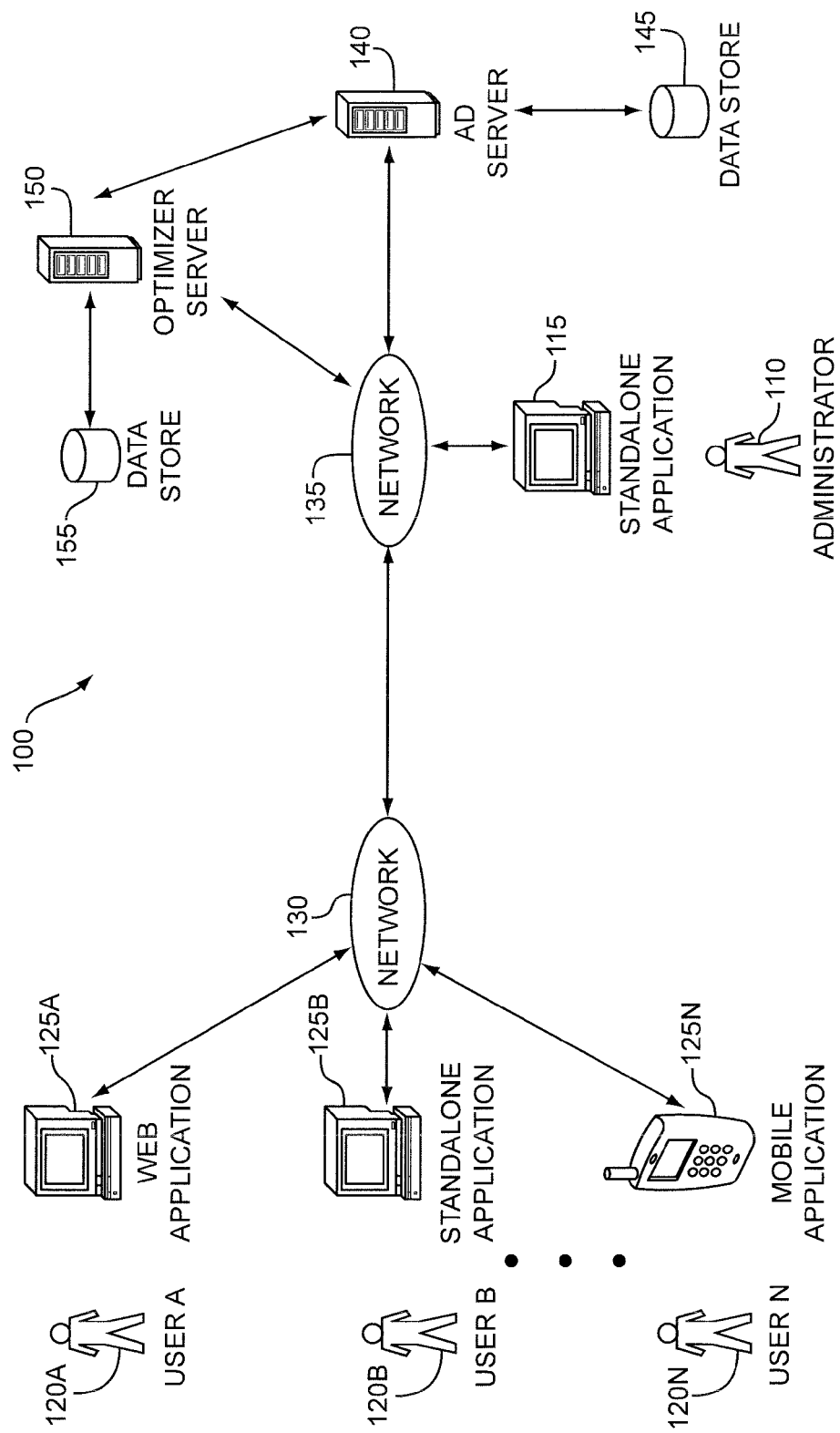
FIG. 1 is a block diagram of a general overview of a network environment and system for distributing advertisement impressions.

A supply of ad impression opportunities preferably comprises opportunities to insert on-line advertising ("ad impressions"), such as inserting variable banner ads into web pages that are transmitted to users. The ads can be allocated selectively, based on characteristics of the user or typical users of the particular web page, or otherwise selected to match user and content information, location, timing and other criteria to advertiser specifications, for targeting the ads to potential customers or web users.

The allocation of increments of a supply of advertisements to meet demand may be optimized in a market for use of advertising opportunities (ad impressions) by establishing a proportion of revenue and/or quantity to be shared between distinct categories of demand with potentially different marginal values. A programmable technique divides all allocations that are projected and later the allocations that actually arise, between a category of pre-committed increments, typically contractually committed ad insertion opportunities with predetermined characteristics (e.g., guaranteed delivery (GD) of ads contracts), and a category of spot sales, such as via ad exchange auctions (e.g., non-guaranteed delivery (NGD) delivery of ads).

To increase opportunities for revenue, the ad impression supply volume for meeting all demands may be increased, for instance by broadening the characteristics targeted by advertisers. Other variables, such as changing web page content or navigational links on web pages, may similarly cause the ad impressions to change in volume. Additionally, ad impressions may change when writers are solicited to write articles about a particular topic (e.g., via an associated content platform).

The supply volume of ad impressions, however, involves a cost when increased beyond a predetermined level, as will be discussed later in more detail. For instance, if a threshold score for qualifying users into specified interest categories is changed such as to capture more ad impressions, the return on investment (ROI) advertisers see from ads delivered to those impressions drops as the ad impressions become increasingly less targeted to the profile of the advertiser. Delivered ads that are less targeted are lower in quality and will likely garner fewer clicks, thus reducing the advertiser's click-through-rate (CTR) on affected advertisements. The disclosed system may automate the process by which ad impressions are advantageously increased so as to generate more revenue for publishers and brokers, such as Yahoo! of Sunnyvale, Calif., but to moderate that increase so as to minimize costs associated with changeable supply of ad impressions. Those costs may be seen in lost advertisers or fewer contracts with advertisers due to a reduction in their ROI, for instance, and thus may be viewed as lost opportunity costs.

A multi-objective approach to optimizing representativeness is modeled herein that seeks to minimize the cost of a changeable volume of ad impressions and to minimize penalties due to under-delivery of ad impressions to satisfy GD contracts while maximizing, in a balanced approach, both GD representativeness and NGD demand revenue. This optimization will take place with reference to buying and selling ad impressions in an advertising marketplace including an ad exchange where over-delivery and under-delivery are also modeled.

FIG. 1 provides a simplified view of a network environment 100 for serving advertisement impressions, factoring both guaranteed demand and non-guaranteed demand, in an optimized way. Not all of the depicted components may be required, however, and some implementations may include additional components not shown in the Figure. Variations in the arrangement and type of the components may be made without departing from the spirit or scope of the claims as set forth herein. Additional, different or fewer components may be provided.

The network environment 100 may include an administrator 110 and one or more users 120A-N with access to one or more networks 130, 135, and one or more web applications, standalone applications, mobile applications 115, 125A-N, which may collectively be referred to as client applications. The network environment 100 may also include one or more advertisement servers 140 and related data stores 145, and one or more optimizer servers 150 and related data stores 155. The users 120A-N may request pages, such as web pages, via the web application, standalone application, mobile application 125A-N, such as web browsers. The requested page may request an advertisement impression from the advertisement server 140 to fill a space on the page. The advertiser server 140 may serve one or more advertisement impressions to the pages in accordance with delivery instructions from the optimizer server 150. The advertisement impressions may include online graphical advertisements, such as in a unified marketplace for graphical advertisement impressions. Some or all of the advertisement server 140, the optimizer server 150, and the one or more web applications, standalone application, mobile applications 115, 125A-N, may be in communication with each other by way of the networks 130 and 135.

The networks 130, 135 may include wide area networks (WAN), such as the Internet, local area networks (LAN), campus area networks, metropolitan area networks, or any other networks that may allow for data communication. The network 130 may include the Internet and may include all or part of network 135; network 135 may include all or part of network 130. The networks 130, 135 may be divided into sub-networks. The sub-networks may allow access to all of the other components connected to the networks 130, 135 in the network environment 100, or the sub-networks may restrict access between the components connected to the networks 130, 135. The network 135 may be regarded as a public or private network connection and may include, for example, a virtual private network or an encryption or other security mechanism employed over the public Internet, or the like.

The web applications, standalone applications and mobile applications 115, 125A-N may be connected to the network 130 in any configuration that supports data transfer. This may include a data connection to the network 130 that may be wired or wireless. Any of the web applications, standalone applications and mobile applications 115, 125A-N may individually be referred to as a client application. The web application 125A may run on any platform that supports web content, such as a web browser or a computer, a mobile phone, personal digital assistant (PDA), pager, network-enabled television, digital video recorder, such as TIVO®, automobile and/or any appliance or platform capable of data communications.

The standalone application 125B may run on a machine that includes a processor, memory, a display, a user interface and a communication interface. The processor may be operatively connected to the memory, display and the interfaces and may perform tasks at the request of the standalone application 125B or the underlying operating system. The memory may be capable of storing data including programmable instructions or computer code. The display may be operatively connected to the memory and the processor and may be capable of displaying information to the user B 125B. The user interface may be operatively connected to the memory, the processor, and the display and may be capable of interacting with a user B 120B. The communication interface may be operatively connected to the memory, and the processor, and may be capable of communicating through the networks 130, 135 with the advertisement server 140. The standalone application 125B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX®, and others.

The mobile application 125N may run on any mobile device that may have a data connection. The data connection may be a cellular connection, a wireless data connection, an internet connection, an infra-red connection, a Bluetooth connection, or any other connection capable of transmitting data. For example, the mobile application 125N may be an application running on an APPLE IPHONE®.

The advertisement server 140 may include one or more of the following: an application server, a mobile application server, a data store, a database server, and a middleware server. The advertisement server 140 may exist on one machine or may be running in a distributed configuration on one or more machines. The advertisement server 140 may be in communication with the client applications 115, 125A-N, such as over the networks 130, 135. For example, the advertisement server 140 may provide a user interface to the users 120A-N through the client applications 125A-N, such as a user interface for inputting search requests and/or viewing web pages. Alternatively or in addition, the advertisement server 140 may provide a user interface to the administrator 110 via the client application 115, such as a user interface for managing the data source 145 and/or configuring advertisements.

Figure 9:
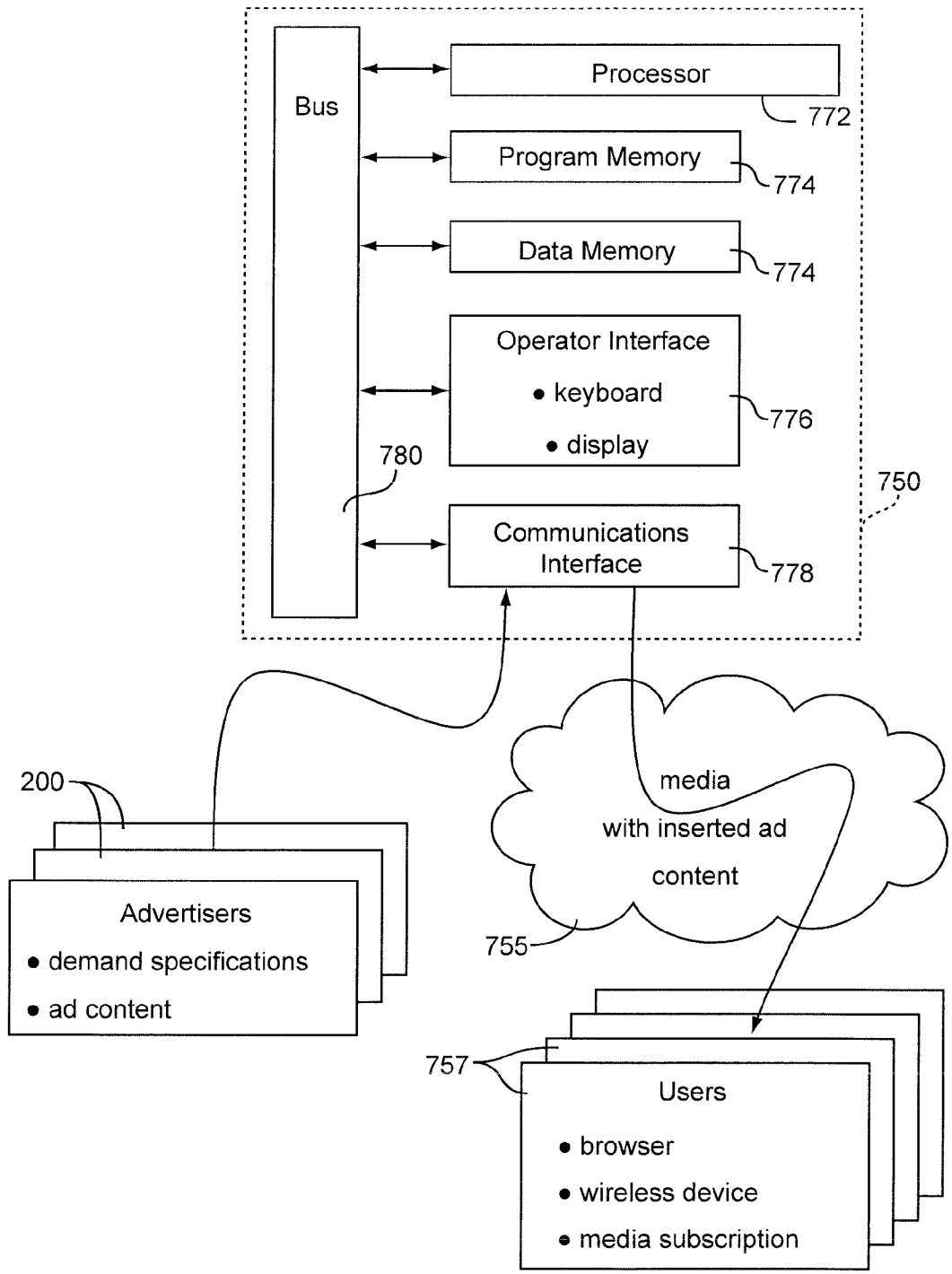
FIG. 9 is an exemplary processing system for implementing the advertisement impression distribution systems and methods.

The service provider server 140 and client applications 115, 125A-N may be one or more computing devices of various kinds, such as the computing device in FIG. 9. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 125A may employ the Hypertext Transfer Protocol ("HTTP") to request information, such as a web page, from a web server, which may be a process executing on the advertisement server 140.

There may be several configurations of database servers, application servers, mobile application servers, and middleware applications included in the advertisement server 140. The data store 145 may be part of the advertisement server 140 and may be a database server, such as MICROSOFT SQL SERVER®, ORACLE®, IBM DB2®, SQLITE®, or any other database software, relational or otherwise. The application server may be APACHE TOMCAT®, MICROSOFT IIS®, ADOBE COLDFUSION®, or any other application server that supports communication protocols.

The networks 130, 135 may be configured to couple one computing device to another computing device to enable communication of data between the devices. The networks 130, 135 may generally be enabled to employ any form of machine-readable media for communicating information from one device to another. Each of the networks 130, 135 may include one or more of a wireless network, a wired network, a local area network (LAN), a wide area network (WAN), a direct connection such as through a Universal Serial Bus (USB) port, and the like, and may include the set of interconnected networks that make up the Internet. The networks 130, 135 may include communication methods by which information may travel between computing devices.

Figure 2:
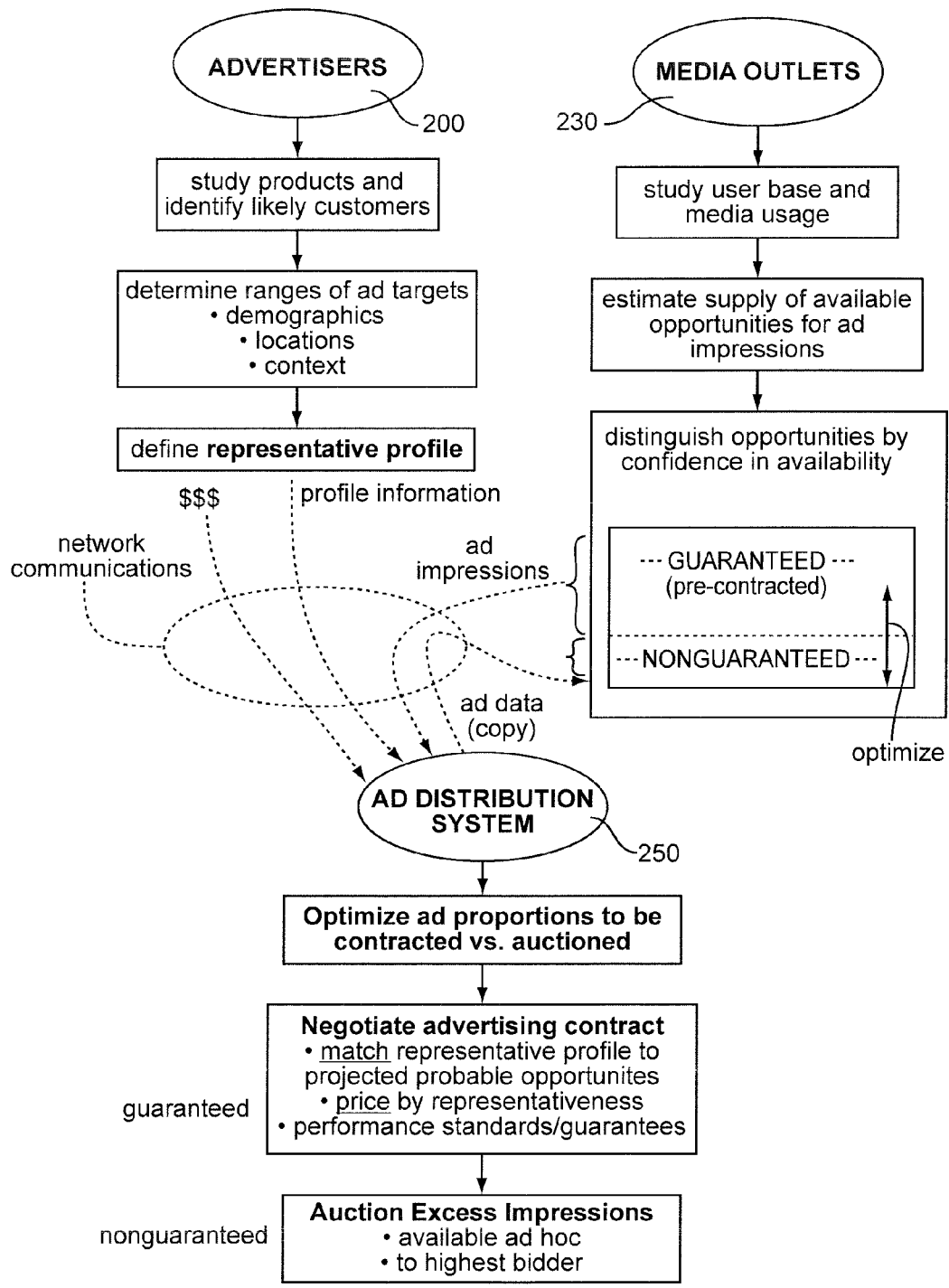
FIG. 2 is a flow/block diagram illustrating a method and system to support a marketing relationship among advertisers, media outlets and an ad distribution system.

FIG. 2 is a flow/block diagram illustrating a method and system to support a marketing relationship among advertisers 200, media outlets 230 and an ad distribution system 250 herein described. Inasmuch as the ad impressions that are to be used to meet the representative demand profile arise over time, an agreement to exploit the ad impressions may rely partly on an estimation of the number and character of ad impressions that arise. If a media outlet is reasonably sure that a given number of ad impressions of a given type arise, then the media outlet can commit contractually to using the ad impressions to meet the demand of particular advertisers whose representative profile encompasses ad impressions of that type. In an advertising contract, it is possible for parties to agree to a "best efforts" obligation to produce exploitable ad impressions, but a contract containing obligations to produce a certain number and type of ad impressions may be preferable. In that case, the guaranteed ad impressions (guaranteed deliver GD ads) can command a better price than potential ad impressions that might be subject to contract but are not guaranteed (non-guaranteed delivery NGD ads) and are uncertain to arise at all.

This situation may be handled in advertising systems by selling guaranteed ad impressions in advance, and selling the additional ad impressions that may arise under different contractual provisions and effectively in a substantially independent market. The present ad distribution system is configured to aid in unifying these two different markets.

An efficient and organized technique may satisfy the demand for distribution of advertising to users. The users can be more or less specifically defined by user characteristics. From the advertisers' perspective, an objective is to enable ads to be targeted to users as a function of the users' characteristics. The users' likely characteristics are known to the media outlets that serve the users, at least because user characteristics correlate with the content of media outlets that the users visit. Often the media outlets may have access to additional subscriber information from browsing history, stored cookies and other factors. The advertisers have preferences and rules for distribution of ads, that may include guidelines based on likely user characteristics and also rules for spreading advertising coverage over a range of users. All such rules, guidelines and preferences on the part of an advertiser, which might result from studies and marketing plans, together define a representative profile of the advertising demand of that advertiser. An advertiser's representative demand profile corresponds to a subset of all opportunities that might become available to insert and display an ad (all the "ad impressions"), and may include some insertions that are of more value to the advertiser than others.

Likewise, from knowledge of user characteristics and from projections of the likely range of users who may be interested enough to visit a certain type of media content in the future, the media outlets can make estimates of the numbers and characteristics of users that are likely to be subject to advertising impressions that might be devoted to displaying an advertiser's content. There is a supply and demand market involving discriminating for ad impressions that meet an advertiser's representative demand profile, allocating and using the ad impressions that arise to meet incremental parts of the representative demand, reporting to the advertiser and collecting revenue in exchange for this service.

In FIG. 2, the advertisers 200 define a representative demand profile that they deem to be appropriate. The advertisers 200 might study their products, commission surveys, collect information from actual customers and so forth, to identify likely targets for ads for a particular product or ads written perhaps to be appealing to some recipients more than others. The advertisers 200 typically have various rules for associating ads with ad impressions of distinct types, and for distributing ads generally over various subsets of a population, not necessarily limited to applying their advertising expenditures only to certain targeted subsets. All such rules and associations make up a representative profile that can be unique to an advertiser or an advertised product.

The media outlets 230 also collect information about their user base and the patterns of user access to and usage of media of one content or another. The media outlets have knowledge of the content of the media and also have knowledge of their users' patterns of access. The media outlets may have subscriber information such as location and demographic data. Some subscriber information can be inferred from a user's access to certain content. All this information is collected and used to study and associate patterns of subscribers and content so as to provide knowledge of the opportunities available to insert advertising that may be of interest to users.

The information collected by media outlets enables projections to estimate the nature and number of ad impressions that are likely to become available at a given time. The information can include, for example, an estimated number of users having defined characteristics who are projected to access a particular web page or other media content source over a given time window. Depending on the information collected, the defined user characteristics might include measures of age, gender, income, family associations, etc., with statistical ranges of confidence in the values.

As a result of collection and study of information, the media outlets or their nominee can determine and define a projected probable inventory of ad impressions that may be offered for sale to advertisers. Within statistical limits, the media outlets may believe that an excess inventory of ad impressions may be available. However, the media outlets are not likely to commit as readily to sale of ad impressions under contracts guaranteeing delivery or containing non-performance penalties, when the availability of the excess ad impressions is unsure. The excess ad impressions in that case might be sold on a spot market when it becomes clear that the ad impressions are available, e.g., immediately before the ad impressions might be used.

According to one aspect, the two markets are to be merged insofar as possible, for ad impressions sold under guaranteed contracts and ad impressions sold only when they prove to be available. This is accomplished in part by optimizing the selected proportion of ad impressions that are committed to guaranteed delivery contracts versus the proportion that are sold if possible when excess ad impressions prove to be available. This is also accomplished in part by providing competition between guaranteed and non-guaranteed demand when accomplishing the delivery of emerging ad impressions as the ad impressions become available. These steps are accomplished by the ad distribution system 250 as an intermediary between the advertisers 200 and media outlets 230.

The ad distribution system 250 functions to optimize the proportions or the division of ad impressions that are allocated to guaranteed contracts or to ad hoc spot sales. The optimization can be accomplished during negotiations as to whether to commit to guaranteed sales, but may also be accomplished repetitively by the ad distribution system 250 as conditions change over time. In addition to negotiations in advance, the ad distribution system 250 matches demand increments of the representative profiles of advertiser versus projected probable opportunities to use ad impressions, and repetitively updates the projections and rebalances the proportions that are used or planned for use either to satisfy guaranteed obligations or to be sold on the ad hoc spot market. The ad impressions are allocated as a function of price and performance, namely to achieve: (1) a high likelihood that guaranteed obligations are met, (2) a close match of allocated ad impressions with the representative profiles of the advertisers, and (3) allocation of the ad impressions to the users that achieve the highest revenue for the media outlets.

Figure 3:
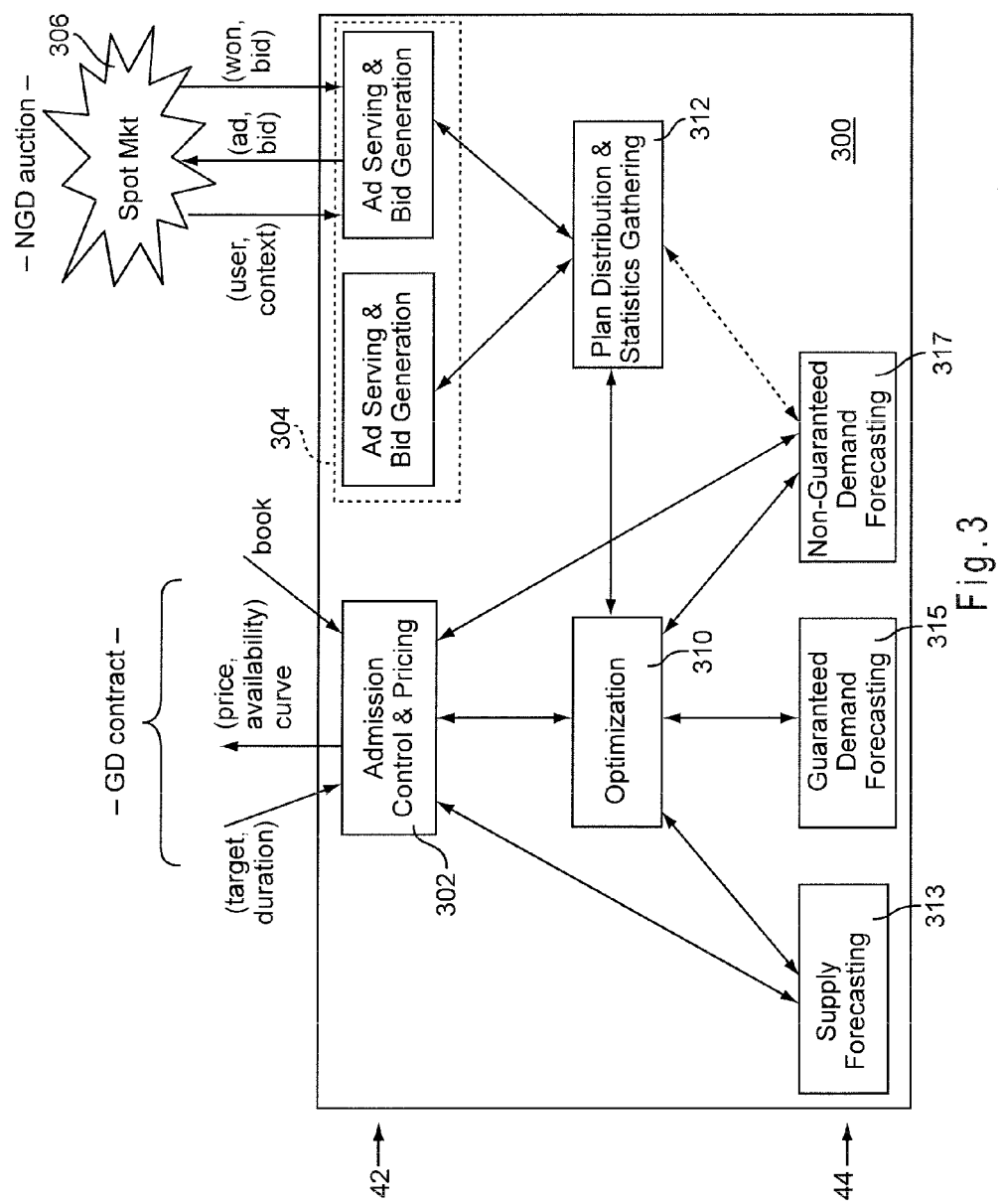
FIG. 3 is a block diagram of an exemplary architecture for advertising delivery systems.
Figure 4:
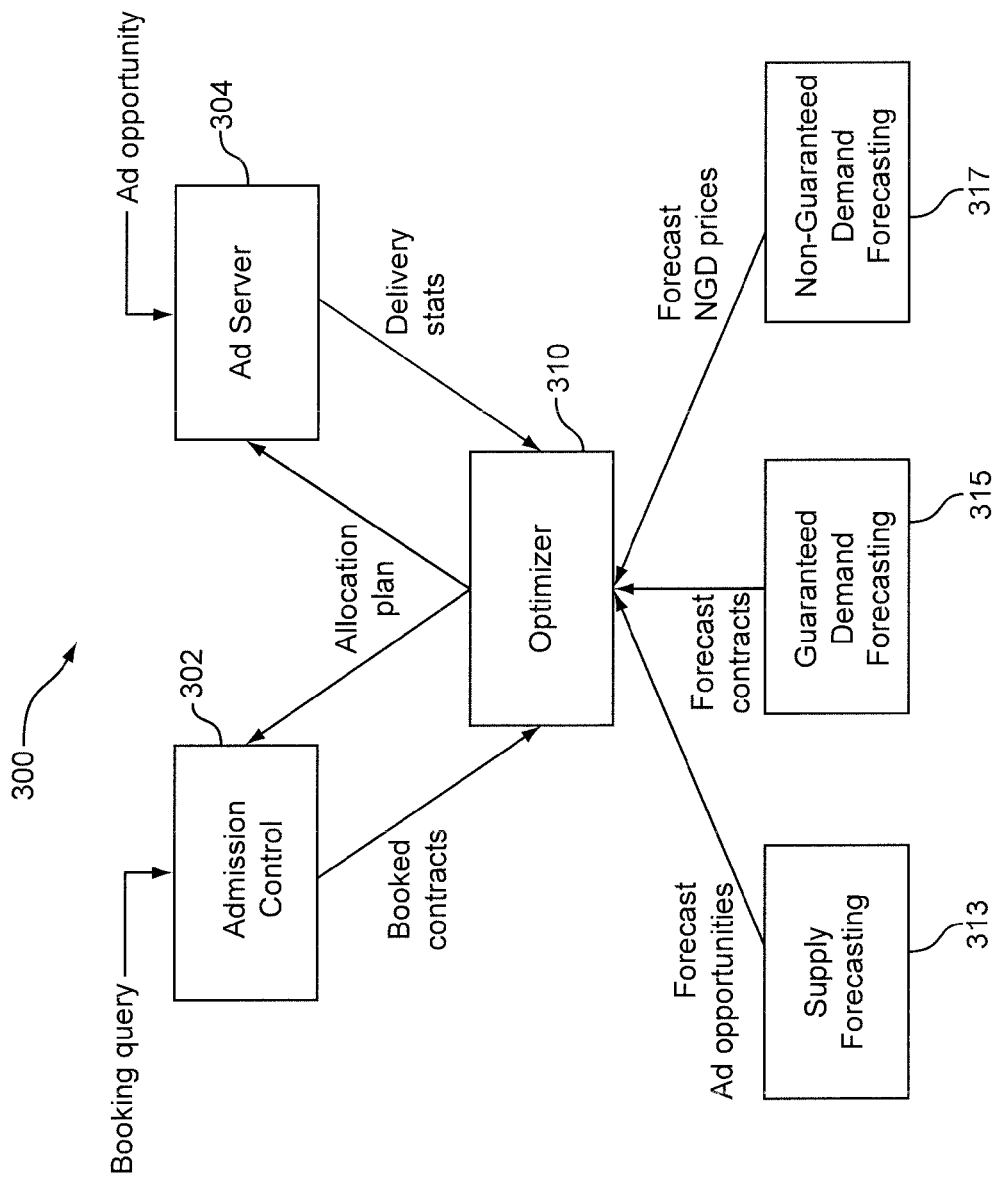
FIG. 4 is block diagram of another exemplary architecture for advertising delivery systems.

FIGS. 3 and 4 are block diagrams illustrating exemplary architectures for advertising delivery systems 300. In FIG. 3, the advertising delivery system 300 is configured to integrate handling of determined commitments to provide ad impressions together with emergent opportunities to make spot sales. The determined commitments are generally termed "guaranteed" contracts or guaranteed delivery (GD) of ad impressions, but the idea of guaranteed contracts encompasses any commitment entered before the moment of allocation of an ad impression to a demand, when the allocation reduces the total supply of remaining ad impressions that are available, and thus reduces the number of ad impressions that might yet be committed to another guaranteed contract or might be allocated for spot sales up to the last possible moment.

The advertising delivery system 300 can be embodied as a service of a programmed network server that manages the allocation of the supply of ad impressions available from subscribing website operators and similar media outlets versus the demand by advertisers to use the ad impressions, optionally providing the interface through which ad content is routed to the media outlets for insertion, as windows, banners and other elements of web pages being composed for display by the respective browser programs that compose the web pages for viewing by users, e.g., when surfing the Worldwide Web. In an advantageous embodiment supported by user interfaces for the advertisers and media distributors or outlets, the system, including methods, can be configured to manage allocation of guaranteed-delivery ad impressions in a number projected by media distributors to be available, and also to manage the offering and ad hoc sale of excess ad impressions that are found to be available beyond those that were projected. These excess impressions can be sold at auction and used up to the time at which it becomes apparent that the number of impressions in the actual supply exceed what was projected. Alternatively or in addition, impressions to be sold at auction do not have to be excess impressions. For example, if the projected auction price is higher than the under-delivery penalty cost, it may be more profitable to sell the impressions at auction, whether or not they are in excess to the projected guaranteed ad impressions.

The advertising delivery system 300 in FIG. 3 can unify the allocation and sale of ads, eliminating artificial separation between the ad impression inventory that is sold months in advance under agreements entailing guaranteed delivery (i.e., obligations as to the number and nature of impressions and potential penalties for inability to deliver) versus the remaining inventory, normally from overly-conservative estimates and projections, to be sold using a real-time auction, spot market or terms of "best efforts" non-guaranteed delivery (NGD).

The advertising delivery system 300 manages advertising to serve contracts (i.e., guaranteed ad impression deliveries) and non-guaranteed (NGD) contracts. As a result, high-quality or most sought after impressions are allocated to the guaranteed contracts and non-guaranteed contracts. This mode for ad impression allocation may realize the full potential of the additional ad impressions that are available when the number of ad impressions proves to be greater than the number that was projected. By automated allocation and management of non-guaranteed delivery impressions, including allocation and contractual commitment of ad impressions immediately prior to the time that the impressions become available, a mix of guaranteed and also non-guaranteed contracts can form a unified marketplace whereby an impression can be allocated to a guaranteed or non-guaranteed contract efficiently, based on the value of the impression to the different contracts, and with less value risked on the ability to project ad impression availability far in advance. A unified marketplace for long term (guaranteed) impressions and short term ones as well, enables equitable allocation of ad impression inventory, and promotes increased competition between guaranteed and non-guaranteed contracts.

One aspect of the ad delivery system 300 is a bidding mechanism that enables guaranteed contracts to bid on the spot-market for each impression and compete directly with non-guaranteed contracts, while still meeting the guaranteed goals for the contracts. This competition is facilitated if the value of ad impressions on the spot market is subject to highly refined targeting. For example, a selection of ad impressions targeted to "one million Yahoo! Finance users from 1 Aug. 2008-31 Aug. 2008" is diluted and potentially less valuable to certain advertisers compared to "100,000 Yahoo! Finance users from 1 Aug. 2008-8 Aug. 2008 who are males between the ages of 20-35 located in California, who work in the healthcare industry and have recently accessed information on sports and autos."

In order to shift to refined targeting, the advertising industry needs to forecast future ad impression inventory to a fine-grained level of targeting, e.g., numerous variables with tight ranges or close adherence to examples. Advantageously, correlations between different targeting attributes are identified and exploited by producing correlated variable values that can be compared directly to match ad impressions with demand. Taken to a very fine level, it may be appropriate to manage contention in a high-dimensional targeting space with hundreds to thousands of targeting attributes because different advertisers can specify different overlapping targeting combinations. If numerous targeting combinations are accepted and guaranteed, the advertising delivery system 300 may help ensure that sufficient inventory is available, while minimizing a supply cost associated with an increase in ad impressions.

In FIG. 3, the advertising delivery system 300 coordinates the execution of various system components, operating as a server with several subsystems devoted to arranging for handling the contractual matching of guaranteed ad impressions allocated to demands according to projections, plus spot market sales of ad impressions that become available, and serving ads to fill the ad impressions.

An admission control and pricing sub-system 302 facilitates guaranteed ad contracts, preferably for a time period up to a year in advance of actual presentation of ad impressions that are contracted. This sub-system 302 assists in pricing guaranteed contracts, and is coupled to supply and demand forecasting subsystems for this purpose.

An ad serving sub-system 304 has a subsystem that matches ad guarantees (demands) with opportunities (ad impressions), including serving the guaranteed impressions and also through ad hoc bidding system whereby selected guaranteed impressions may be supplied by deals on the spot market at favorable terms.

The admission control module 302 has input and output signal paths for interacting with sales persons who negotiate and contract with advertisers. A sales person may issue a query that defines a specified target (e.g., "Yahoo! finance users who are California males who like sports and autos") and the Admission Control module determines and reports the available inventory of ad impressions for the target and the associated price. The sales person can then book a contract accordingly.

The ad server module 304 takes on an ad impression opportunity, which comprises a user such as a web page viewer and a context, such as a URL for the visited page and information on the theme of the content of the web page begin viewed. Other information useful for targeting may be available, such as the succession of URLs visited by the user prior to the visited page. The ad server module 304 returns a guaranteed ad to fill the ad impression opportunity, and determines an amount that the system is willing to bid for that opportunity in the spot market (an ad exchange 306).

The operation of the ad delivery system 300 is orchestrated by an optimization module 310. This module periodically takes into account a forecast of supply (future impressions that are projected), future guaranteed demand (projected guaranteed contracts) and non-guaranteed demand (expected bids in the spot market) that are generated from a supply forecasting module 313, and two demand forecasting modules 315, 317 that are arranged to distinguish between guaranteed and non-guaranteed demand elements. However, as ad impressions are made available, the system can decide whether to use the ad impression to satisfy the guaranteed commitments or to apply them to the spot market.

The optimization module 310 matches supply to demand using an overall objective function as described herein, namely matching instances of ad impressions (supply) to meet instances of demand according to the advertisers' representative profiles of demand, preferably using a norm function that matches supply and demand according to the distance between the variable values of the supply and demand instance attributes in multi-dimensional space. The optimization module 310 sends a summary plan characterizing the optimization results to the admission control and pricing module 302 and to a plan distribution and statistics gathering module 312. The plan distribution and statistics gathering module 312 sends information defining the plan to the ad servers 304. The plan produced by the optimization module can be updated periodically as estimates for supply, demand, and delivered impressions are available, e.g., every few hours.

Given the plan, the admission control and pricing module 302 works as follows. When a sales person issues a targeting query for some duration in the future, the system first invokes the supply forecasting module 313 to identify how much inventory is available for that target and duration. As mentioned earlier, targeting queries can be very fine-grained, thus having numerous values in a multi-dimensional space having numerous coordinate axes. The supply forecasting module uses a scalable multi-dimensional database indexing technique for this purpose, with bit-map indices, to enable correlations between different targeting attributes so that the values of instances of supply and demand have some coordinate axes in common, and so that where values are unknown, a statistical probability may be available either to infer a likely value or to dictate that the representative profile should entail distributing supply or demand instances over a range of values for a coordinate axis.

Generating values on the coordinate axes for supply and demand instances is only a part of the larger problem of allocating supply and demand because there is contention between alternative demands for the same instance of supply and vice versa. For example, if there are two demand contracts: "Yahoo! finance users who are California males" and "Yahoo! users who are aged 20-35 and interested in sports," it may be advantageous to take into account the correlation between the demand instances to avoid double-counting, in this example because male California finance users may have a high correlation with that age bracket and with an interest in sports.

In order to deal with this contention problem in a high-dimensional space, a supply forecasting system preferably computes the match between supply instances as impression samples as opposed to a raw count of available ad impressions. The samples of impressions are used as inputs to compute whether multiple demand contracts are connected to the attributes of a given impression.

Given the impression samples, the admission control module 302 uses the plan communicated by the optimization module 312 to calculate the contention between contracts in the high-dimensional space, and returns an available inventory measure to the sales persons without double-counting. In addition, the admission control module 302 calculates a proposed price for each contract and returns that along with the quantity of available impressions.

Given the plan, the ad server module 304 works as follows. When an opportunity is presented, for example because a user's browser is engaged in generating the display of a web page from HTML data and encounters a graphic that is linked to a web address associated with the ad server, an IP call is made for associated media content (e.g., text, graphics, animation, etc.). The ad server module 304 calculates the contention among contracts for this impression in a manner similar to what is done by the admission control and pricing module 302 when determining contractual terms beforehand. Given this instance of an available ad impression, and with contention information and knowledge about non-guaranteed demands, the ad server module 304 responds by selecting a contract with an instance to be filled. The ad server module 304 generates a bid that serves to evaluate the contract, and sends information on the contract and the bid to the exchange element 306. It is then possible for the exchange to associate an instance of a non-guaranteed contract, e.g., to sell the ad impression rather than to fill it in satisfaction of the guaranteed contract that is in hand. If the ad impression is sold, the ad server can return content provided from the buyer through the exchange module 306. If the terms available over the exchange are less favorable, the ad server 304 returns the content associated with the guaranteed demand instance.

Matching a given set of contracts—representative profile demands having values associated with various variables—versus and a set of impression samples—ad impression instances of supply, also having values associated with various values—is a core task, and is served substantially by the optimization module 310. The task is to decide how to allocate the projected or available ad impressions to satisfy the specifications of the demand contracts. One of the goals is a representative allocation. When a contract demand might be satisfied by multiple eligible ad impression types, each of which would contribute in some degree to meeting the demand, it is desirable to allocate some volume of each eligible impression type to corresponding contract demands. In short, it is desirable to allocate supply instances that have a given set of attribute values, to favor targets who have matched attribute values, but not to allocate all the supply to targets based on one attribute value at the expense of others. It is desirable to spread the allocation volume in a manner that is related to the number of instances of all impression types and demand instances, for example proportionately. Advantageously, the allocation favors but does not serve exclusively, those matches wherein certain variable attributes are close in value (i.e., the viewer in context closely meets one of several measures targeted) at the expense of other attributes.

In the unified marketplace, there are two competing sources of demand to which a particular ad impression might be allocated. An ad impression might be used to satisfy a guaranteed delivery (GD) obligation under a contract, or might be sold on the non-guaranteed delivery (NGD) spot market. In a market that is not unified, and assuming that there was sufficient demand from advertisers at the prices offered, the ad impressions of the media distributors might be contractually guaranteed only insofar as their projected availability has a high level of confidence. It is an aspect of the present technique, however, not to allocate only on confidence in availability but instead to seek to maximize the efficiency and value of the allocation to both portions of the demand. Accordingly, the optimization module is used to seek an efficient division of allocations between the guaranteed and spot markets.

When impressions are allocated to guaranteed delivery contracts, the representativeness of the allocation is the major goal, namely to closely match the allocation to the number and type of ad impressions that define the representative profiles of the advertisers. On the other hand, when ad impressions are sold on the non-guaranteed delivery spot market, the goal is merely revenue.

The total available ad impressions are a finite supply. If an impression is allocated to guaranteed delivery, that impression is not available for non-guaranteed demand, and vice versa. The marginal revenue that might be obtained from sale of an ad impression on the spot market therefore is compared directly with the marginal value of using that same ad impression to satisfy a guaranteed delivery obligation. As explained herein, this gives a basis in which to make reasoned decisions as to what proportion of available ad impressions should most efficiently be devoted to meeting guaranteed delivery obligations and what proportion should be sold on the ad hoc spot market, for example at auction. Such decisions are enabled in the optimization module 310.

The marginal revenue from a spot market sale of an ad impression is a lost opportunity that is comparable to a cost for a guaranteed delivery allocation of that ad impression. One task of the optimization module 310 is to decide how to balance the allocations between guaranteed delivery contracts and the non-guaranteed delivery spot market to achieve efficiency and other business goals. Another task of the optimization module 310 is to minimize a supply cost associated with a changeable number of ad impressions.

The question of whether to allocate to guaranteed or non-guaranteed allocations is regarded herein as a multi-objective optimization problem with the number and marginal revenue of both allocation categories contributing to a common total but their respective contributions competing for the available supply. Both guaranteed delivery value (which equates to representativeness) and non-guaranteed delivery market revenue (which as an opportunity cost can be assessed against guaranteed delivery value) are modeled explicitly as described herein. Modeling in this way provides a framework to test the results of different functions for evaluating representativeness, enabling the model to identify a corresponding efficient allocation between guaranteed and spot market allocations. The model effectively provides business controls that when imposed on a mathematical optimization that produces a trajectory or range of potential control points, establishes one point in the range to be used as the basis of control. This result accrues using a methodology that establishes a monetary value equivalent to the value of representativeness, for use in solving a multi-objective optimization problem.

FIG. 4 is a block diagram of an alternate architecture for the advertising delivery system 300. An optimizer 310 utilizes inputs from the supply forecasting module 313, the guaranteed demand forecasting module 315, and the non-guaranteed demand forecasting modules 317. Supply forecasting 313 provides forecast ad opportunities (impressions) from which the optimizer 310 may determine a cost associated with a supply volume of the ad impressions, which will be discussed in more detail later. Guaranteed demand forecasting 315 provides forecast contracts and non-guaranteed demand forecasting 317 provides forecast non-guaranteed demand prices. The optimizer 310 uses the inputs to run optimization, such as described with regard to the algorithms below and with reference to FIG. 3, to generate an ad allocation plan.

The optimizer 310 allocates the plans to both admission control 302 and the ad server 304. The admission control 302 uses the allocation plan to calculate inventory level to decide whether or not to accept a booking query. The ad server 304 uses the allocation plan to decide whether to allocate an incoming ad opportunity to serve a guaranteed contract or sell the ad opportunity to the non-guaranteed marketplace. The ad server 304 serves an advertisement to an application 125A-M, such as a browser, of user 120A-N in accordance with the plan. The optimizer 310 executes allocation optimization algorithms periodically, such as when inputs are updated with all the forecasts as well as feedback of newly-booked contracts from the admission control 302 and advertisement delivery statistics from the ad server 304.

Algorithms, such as those used by the optimizer 310 of the system 300, are modeled mathematically and shown graphically using the variables listed and defined in Table I:

TABLE I

| | |
|---|---|
| $i$: | Index of ad opportunity (supply), $i = 1, \ldots, I$ |
| $j$: | Index of guaranteed contract (demand), $j = 1, \ldots, J$ |
| $s_i$: | Supply volume of supply $i$ |
| $d_j$: | Demand volume of demand $j$ |
| $r_i$: | Non-guaranteed price (opportunity cost) of supply $i$ |
| | • Splits to $r_i^b$ and $r_i^s$ when both buying and selling are modeled |
| $v_j$: | Allocation priority of demand $j$ |
| $b_{jk}$: | Break points of piecewise linear penalty function for demand $j$ |
| $c_j$: | Under-delivery penalty cost for demand $j$ |
| | • For piecewise linear penalty function, $c_j = (c_{j1}, \ldots c_{jKj})$ |
| $B_j$: | Set of supplies that are eligible to serve demand $j$ |
| $S_j$: | Total supply volume that is eligible for demand $j$, e.g., $S_j = \Sigma_{i \in B_j} s_i$ |
| $\theta_{ij}$: | Proportional allocation from supply $i$ to demand $j$, e.g., $\theta_{ij} = \dfrac{d_j}{S_j} S_i$ |
| $x_{ij}$: | (variable) Allocation volume from supply $i$ to demand $j$ |
| $y_i$: | (variable) Volume of supply $i$ sold in the NGD marketplace |
| | • Splits to $y_i^b$ and $y_i^s$ when both buying and selling are modeled |
| $z_j$: | (variable) Under-delivery volume of demand $j$ |
| | • For piecewise linear penalty function, $z_j = (z_{j1}, \ldots z_{jKj})$ |

The advertising inventory allocation problem can be modeled as the following multi-objective allocation model.

$$\min \begin{bmatrix} f_1(z) = \sum_j \sum_k c_{jk} z_{jk} \\ f_2(y) = -\sum_i r_i y_i \\ f_3(x; \theta) = \sum_j \frac{1}{2} \sum_i \frac{v_j}{\theta_{ij}} (x_{ij} - \theta_{ij})^2 \end{bmatrix} \quad (1)$$

$$\text{s.t.} \sum_{j|i \in B_j} x_{ij} + y_i = s_i \; \forall \, i \quad (2)$$

$$\sum_{i \in B_j} x_{ij} + \sum_k z_{jk} = d_j \; \forall \, j \quad (3)$$

$$x_{ij} \geq 0 \; \forall_{i,j} \quad (4)$$

$$y_i \geq 0 \; \forall \, i \quad (5)$$

$$0 \leq z_{jk} \leq b_{j,k-1} \; \forall \, j, k \geq 1 \quad (6)$$

$$z_{j0} \leq 0 \quad (7)$$

There are three objectives in this model, where $f_1(z)$ is the under-delivery penalty cost, $f_2(y)$ is the negative NGD revenue where minimizing $f_2(y)$ is equivalent to maximizing the NGD revenue, and $f_3(x;\theta)$ is the representativeness of allocation for GD contracts. These constraints describe the basic network flow of the optimization model, e.g., for each supply node, the total allocation to both GD contracts and NGD market must equal the supply volume; and for each demand node, the total allocation from all eligible supply nodes plus the under-delivery volume (if any) must equal the demand volume.

Figure 5:
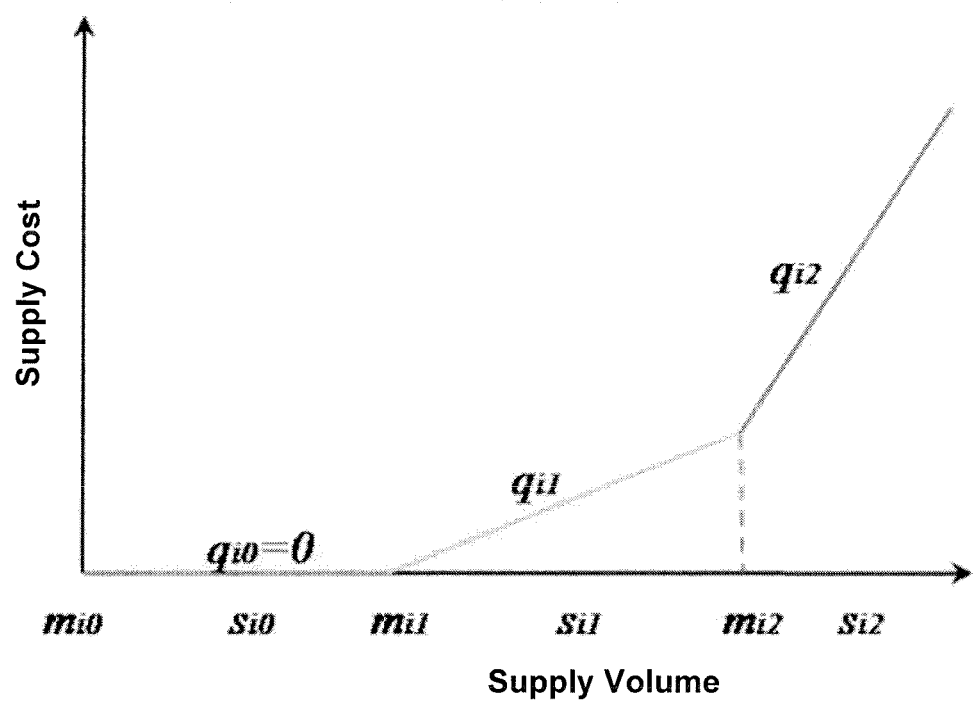
FIG. 5 is a graphic depiction of a cost of supply function when supply volume of ad impressions fluctuates.
Figure 6:
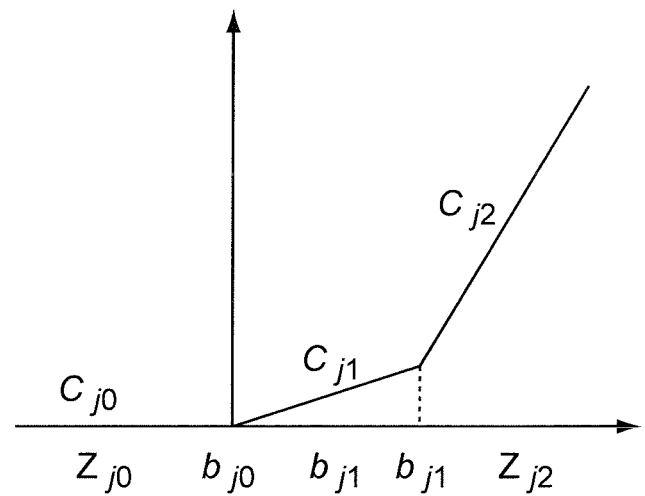
FIG. 6 is a graphic depiction of an under-delivery penalty function.
Figure 7:
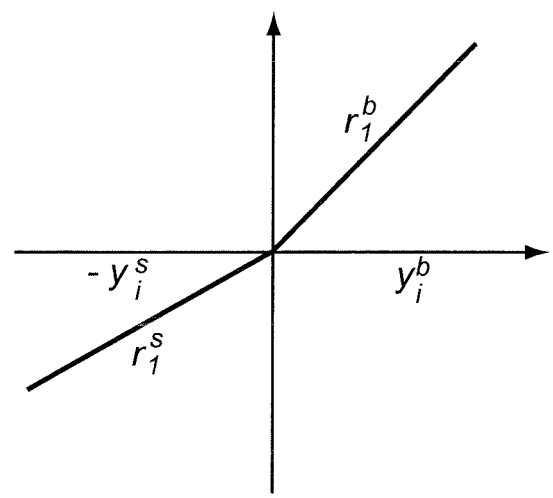
FIG. 7 is a graphic depiction of a non-guaranteed cost and revenue function.

When the supply of ad impressions is changeable, the inflated supply volume is associated with a cost. Assume that the cost of supply $i$ can be modeled by a piece-wise linear convex function as shown in FIG. 5, where $$0 = m_{i0} \leq m_{i1} \leq \ldots \leq b_{i,L_i+1} = \infty \quad (8)$$

are the break points, $$0 = q_{i0} \leq q_{i1} \leq \ldots \leq b_{iL_i} \quad (9)$$

are the costs associated with each segment of the cost function and $$s_i = (s_{i0}, \ldots, s_{iL_i}) \quad (10)$$

is the variable of the supply volume. Note that the break point $m_{il}$ represents the threshold of the supply volume, below which the cost of supply is zero. Any supply volume above the threshold is associated with a cost. Adding this cost as $f_4(s)$ into the multi-objective allocation model of equation (1), the model may be recast as:

$$\min \begin{bmatrix} f_1(z) = \sum_j \sum_k c_{jk} z_{jk} \\ f_2(y) = -\sum_i r_i y_i \\ f_3(x; \theta) = \sum_j \frac{1}{2} \sum_i \frac{v_j}{\theta_{ij}} (x_{ij} - \theta_{ij})^2 \\ f_4(s) = \sum_i \sum_l m_{il} s_{il} \end{bmatrix} \quad (11)$$

$$\text{s.t.} \sum_{j|i \in B_j} x_{ij} + y_i = \sum_l m_{il} s_{il} \; \forall \, i \quad (12)$$

$$\sum_{i \in B_j} x_{ij} + \sum_k z_{jk} = d_j \; \forall \, j \quad (13)$$

$$x_{ij} \geq 0 \; \forall_{i,j} \quad (14)$$

$$y_i \geq 0 \; \forall \, i \quad (15)$$

$$0 \leq z_{jk} \leq b_{jk} - b_{j,k-1} \; \forall \, j, k \quad (16)$$

$$0 \leq s_{il} \leq m_{i,l+1} - m_{i,l} \; \forall \, j, l \quad (17)$$

The GD (guaranteed demand) representativeness utility function is assumed to be separate in terms of each demand $j$.

$$f_3(x, \theta) = \sum_j f_3^j(x_j, \theta_j)$$

The function term $f_3^j(x_j, \theta_j)$ can be formulated in different ways. A few examples are listed as follows.

Base on $L_2$ distance $$f_3^j(x_j, \theta_j) = \frac{1}{2} \sum_i \frac{v_j}{\theta_{ij}} (x_{ij} - \theta_{ij})^2$$

Base on $L_1$ distance $$f_3^j(x_j, \theta_j) = \sum_i \frac{v_j}{\theta_{ij}}(x_{ij} - \theta_{ij})$$

Base on $L_\infty$ distance $$f_3^j(x_j, \theta_j) = \max_i \frac{v_j}{\theta_{ij}}|x_{ij} - \theta_{ij}|$$

Base on K-L divergence $$f_3^j(x_j, \theta_j) = \sum_i v_j x_{ij} \log\left(\frac{x_{ij}}{\theta_{ij}}\right)$$

As a reminder, the multi-objective model may include multiple objectives, such as the following four objectives:
1. minimize under-delivery penalty of GD contracts;
2. maximize NGD revenue (or equivalently, minimize NGD cost);
3. minimize a cost of the advertisement impressions (or supply) when the supply volume fluctuates; and
4. maximize GD representativeness.

The four objectives may be interrelated such that to achieve maximum NGD revenue by serving ad impressions to the NGD market, GD representativeness may decrease. Likewise, to serve ad impressions to maximize GD representativeness, that may impact NGD revenue. There may also be tradeoffs between under-delivery penalties and NGD revenue. If enough ad impressions do not exist to satisfy all the GD contracts, an under-delivery penalty may apply. In the alternative, or in addition, the number advertisement impressions may be increased to satisfy all the GD contracts while minimizing a cost as a result of making such a change to the number of ad impressions.

Furthermore, an added revenue from serving an ad impression to the NGD market instead of the GD market may be greater than the under-delivery penalty, which may be acceptable if a volume of the ad impressions cannot be increased due to minimization of the cost of changing supply volume. The system may also buy ad impressions from the market. In this case, the system may minimize the NGD cost. The system may also allow for over-delivery to the market. The following approach may be used to help determine whether to serve a particular ad impression to an NGD market or a GD market, and which GD market to serve it to. The following may also be used to minimize a cost of changing the supply of ad impressions, and therefore balance the benefits of being able to deliver more ad impressions to both the GD and NGD markets while avoiding loss of advertiser revenues due to decreasing ad impression quality.

A solution for a multi-objective program may be referred to as efficient if there is no other solution that is equal or better in all objectives and is better in at least one objective. All the efficient solutions constitute the efficient frontier. Solving the multi-objective optimization problem seeks to find a solution on the efficient frontier corresponding to specified priority or preference between the objectives. There are different approaches to the problem to get an efficient solution.

One approach is to optimize the weighted sum of objectives:

$$\min w_1 f_1(z) + w_2 f_2(y) + w_3 f_3(x;\theta) + w_4 f_4(s) \quad (18)$$

$$s.t.\ \Sigma_{j|i \in B_j} x_{ij} + y_i = \Sigma_l m_{il} s_{il} \forall i \quad (19)$$

$$\Sigma_{i \in B_j} x_{ij} + \Sigma_k z_{jk} = d_j \forall j \quad (20)$$

$$x_{ij} \geq 0 \forall i,j \quad (21)$$

$$y_i \leq 0 \forall i \quad (22)$$

$$0 \leq z_{jk} \leq b_{jk} - b_{j,k-1} \forall j,k \quad (23)$$

$$0 \leq s_{il} \leq m_{i,l+1} - m_{i,l} \forall i,l \quad (24)$$

where $w = (w_1, w_2, w_3, w_4) \geq 0, \Sigma_1^4 w_1 = 1$ are the weights for the relative priority of the objectives. A higher prioritized objective should be solved first. It may, however, be difficult to set the weights to truly represent the priority. For example, to set the right weight, the system needs to determine how much one unit of representativeness is worth in terms of a dollar amount. Although the under-delivery penalty $f_1(z)$, the NGD revenue $f_2(y)$ and supply cost $f_4(s)$ may be in terms of monetary values and thus easily compared to each other, the representativeness utility $f_3(x;\theta)$ has abstract mathematical meaning (distance to the proportional allocation), and it is thus not straightforward to compare the representativeness with the other objectives.

Another approach to multi-objective optimization is via goal programming. The system may solve each objective one by one, by adding constraints on the values of one or more previously-solved objectives, which are also referred to herein as requirements. No specific order is necessary as the below steps may be taken in different orders so long as at least one requirement determined from solving another objective includes a new constraint. Accordingly, the below is but one example of a possible sequence of steps in the goal programming algorithm. Imposing a new constraint on a value of a requirement may also be referred to as relaxing the earlier-solved requirement to allow for less than an optimum value for that requirement. Such relaxing earlier-solved requirements may result in a more balanced allocation plan in terms of delivering ad impressions between GD contracts and in the NGD market.

Step 1: Minimize Under-Delivery Penalty $$\min f_1(z) = \Sigma_j \Sigma_k c_{jk} z_{jk} \quad (25)$$

$$s.t.\ \Sigma_{j|i \in B_j} x_{ij} + y_i = \Sigma_l m_{il} s_{il} \forall i \quad (26)$$

$$\Sigma_{i \in B_j} x_{ij} + \Sigma_k z_{jk} = d_j \forall j \quad (27)$$

$$0 \leq z_{jk} \leq b_{jk} - b_{j,k-1} \forall j,k \quad (28)$$

$$0 \leq s_{il} \leq m_{i,l+1} - m_{i,l} \forall i,l \quad (29)$$

No extra constraints are added in this step or any of the steps if executed first in the sequential order of algorithmic steps.

Step 2: Minimize NGD Cost (Maximize NGD Revenue)

$$\min f_2(y) = -\Sigma_i r_i y_i \quad (30)$$

$$s.t.\ \Sigma_{j|i \in B_j} x_{ij} + y_i = \Sigma_l m_{il} s_{il} \forall i \quad (31)$$

$$\Sigma_{i \in B_j} x_{ij} + \Sigma_k z_{jk} = d_j \forall j \quad (32)$$

$$f_1(z) \leq (1+\eta_1) f_1^* \quad (33)$$

$$y_i \geq 0 \forall i \quad (34)$$

$$0 \leq z_{jk} \leq b_{jk} - b_{j,k-1} \forall j,k \quad (35)$$

$$0 \leq s_{il} \leq m_{i,l+1} - m_{i,l} \forall i,l \quad (36)$$

where $f_1^*$ is the optimum objective value of total under-delivery penalty cost from the first step and $\eta_1 \geq 0$ is the percentage of $f_1^*$ to relax. For example, if the optimum (minimum) under-delivery penalty cost is $1,000 and $\eta_1=0.9$, the model can afford the under-delivery penalty cost up to $1,100 so as to maximize the NGD revenue.

Step 3: Minimize Ad Impression Supply Cost $$\min f_4(s) = \Sigma_i \Sigma_l m_{il} s_{il} \quad (37)$$

$$s.t. \ \Sigma_{j|i \in B_j} x_{ij} + y_i = \Sigma_l m_{il} s_{il} \forall i \quad (38)$$

$$\Sigma_{i \in B_j} x_{ij} + \Sigma_k z_{jk} = d_j \forall j \quad (39)$$

$$f_1(z) \leq (1+\eta_1) f_1^* \quad (40)$$

$$f_2(y) \leq (1+\eta_2) f_2^* \quad (41)$$

$$y_i \geq 0 \forall i \quad (42)$$

$$0 \leq z_{jk} \leq b_{jk} - b_{j,k-1} \forall j,k \quad (43)$$

$$0 \leq s_{il} \leq m_{i,l+1} - m_{i,l} \forall i,l \quad (44)$$

where $f_1^*$ and $f_2^*$ are the optimum objective values of total under-delivery penalty cost and NGD revenue from the last two steps, respectively, and $\eta_1 \geq 0$ and $\eta_2 \geq 0$ are the percentages of $f_1^*$ and $f_2^*$ to relax, respectively. For example, if the optimum (minimum) under-delivery penalty cost is $1,000, the optimum (maximum) NGD revenue is $1,000,000, where $\eta_1=0.9$, and $\eta_2=0.9$, the model can afford the maximum under-delivery penalty cost of $1,100 and the minimum NGD revenue of $900,000 so as to minimize the ad impression supply cost.

Step 4: Maximize GD Representativeness $$\min f_3(x;\theta) \quad (45)$$

$$s.t. \ \Sigma_{j|i \in B_j} x_{ij} + y_i = \Sigma_l m_{il} s_{il} \forall i \quad (46)$$

$$\Sigma_{i \in B_j} x_{ij} + \Sigma_k z_{jk} = d_j \forall j \quad (47)$$

$$f_1(z) \leq (1+\eta_1) f_1^* \quad (48)$$

$$f_2(y) \leq (1+\eta_2) f_2^* \quad (49)$$

$$f_4(s) \leq (1+\eta_4) f_4^* \quad (50)$$

$$x_{ij} \geq 0 \forall i,j \quad (51)$$

$$y_i \geq 0 \forall i \quad (52)$$

$$0 \leq z_{jk} \leq b_{jk} - b_{j,k-1} \forall j,k \quad (53)$$

$$0 \leq s_{il} \leq m_{i,l+1} - m_{i,l} \forall i,l \quad (54)$$

where $f_1^*$, $f_2^*$ and $f_4^*$ are the optimum objective values of total under-delivery penalty cost, NGD revenue and supply cost from the last three steps, respectively, and $\eta_1 \geq 0$, $\eta_2 \geq 0$, and $\eta_4 \geq 0$ are the percentages of $f_1^*$, $f_2^*$, and $f_4^*$ to relax, respectively. For example, if the optimum (minimum) under-delivery penalty cost is $1,000, the optimum (maximum) NGD revenue is $1,000,000, the optimum (minimum) supply cost is $2,000, where $\eta_1=0.9$, $\eta_2=0.9$, $\eta_4=0.95$, the model can afford the maximum under-delivery penalty cost of $1,100, the minimum NGD revenue of $900,000, and the maximum supply cost of $2,100 so as to maximize the GD representativeness.

When the under-delivery penalty $f_1(z)$, the NGD revenue $f_2(y)$, and $f_4(s)$ are all of monetary values, it is meaningful to combine them using weighted sum. The optimal monetary objective value of the combined function can then be used as a guideline for the non-monetary objective of representativeness.

Step 1: Optimize Monetary Objectives $$\min f_{124}(y,z,s) = w_1 \Sigma_j \Sigma_k c_{jk} z_{jk} - w_2 \Sigma_i r_i y_i + w_4 \Sigma_i \Sigma_l m_{il} s_{il} \quad (55)$$

$$s.t. \ \Sigma_{j|i \in B_j} x_{ij} + y_i = \Sigma_l m_{il} s_{il} \forall i \quad (56)$$

$$\Sigma_{i \in B_j} x_{ij} + \Sigma_k z_{jk} = d_j \forall j \quad (57)$$

$$y_i \geq 0 \forall i \quad (58)$$

$$0 \leq z_{jk} \leq b_{jk} - b_{j,k-1} \forall j,k \quad (59)$$

$$0 \leq s_{il} \leq m_{i,l+1} - m_{i,l} \forall i,l \quad (60)$$

Step 2: Optimize Non-Monetary Objectives $$\min f_3(x;\theta) \quad (61)$$

$$s.t. \ \Sigma_{j|i \in B_j} x_{ij} + y_i = \Sigma_l m_{il} s_{il} \forall i \quad (62)$$

$$\Sigma_{i \in B_j} x_{ij} + \Sigma_k z_{jk} = d_j \forall j \quad (63)$$

$$f_{124}(y,z,s) \leq (1+\eta_{124}) f_{124}^* \quad (64)$$

$$x_{ij} \geq 0 \forall i,j \quad (65)$$

$$y_i \geq 0 \forall i \quad (66)$$

$$0 \leq z_{jk} \leq b_{jk} - b_{j,k-1} \forall j,k \quad (67)$$

$$0 \leq s_{il} \leq m_{i,l+1} - m_{i,l} \forall i,l \quad (68)$$

where $f_{124}^*$ is the optimal objective value of monetary cost from the first step and $\eta_{12} \geq 0$ are the percentages of $f_{124}^*$ to relax.

The supply cost function $f_4(s)$ above is assumed to be piece-wise linear and convex, which enables the minimization of supply cost to be modeled as continuous linear programming (LP). In general, the supply cost function may not be convex, in which case integer variables would have to be introduced, resulting in a mixed integer problem that is hard to solve for a large-scale model.

Note that the supply volume $s_i = (s_{i0}, \ldots, s_{iL_i})$ is the variable of supply volume. Since the cost associated with the first segment of the cost function, $q_{i0}=0$, the maximization of NGD revenue will force the solution $s_{i0}=m_{i1}$. The solution of the remaining elements of $s_i$ will depend on the trade-off among the objectives. However, the convexity assumption of the supply cost function will guarantee that $$s_{il} < m_{i,l+1} - m_{i,l} \Rightarrow s_{i,l+1} = 0. \quad (69)$$

The advertising distribution system as disclosed mediates and distributes advertising opportunities, especially insertions of ads on web pages, according to representative targeting profiles of advertisers. The number and characteristics of future ad impressions is forecast. A portion is allocated to guaranteed-delivery advertiser contracts and the remainder is offered on a spot market. A division between guaranteed and spot market allocations is sought to maximize revenue, taking into account a value associated with meeting the representative profiles of advertisers and the quality of the ad impressions available for delivery. The value of representativeness can be inferred from the marginal revenue of a spot market sale, and optionally weighted.

The techniques as described are not limited to an Internet based advertising distribution system and can be applied to other instances where there is a need to allocate supply and demand while delivering value in exchange for revenue wherein the demand increments fall into categories having at least one of quantities and revenues that differ between the categories. Inasmuch there are totals of quantity and revenue, it is known that an allocation to one category reduces the allocation to the other category. A relationship can be projected as described that demonstrates the quantities and revenues that result from allocating the total supply more or less to one or the other of the at least two distinct categories, from zero to 100% or at least from zero to a maximum proportion of the total supply. What remains is to determine the operating point.

One or more goals may be imposed on the relationship in addition to accounting for distribution of all the supply to one or the other of the allocation categories. The goal helps to determine a point in the relationship curve that corresponds to a particular proportionate allocation. The supply increments are then allocated to the demand increments at this particular proportion in at least one of a planned allocation and an actual allocation including delivering the supply increments. This allocation can be used when planning the proportion of projected ad impressions devoted to guaranteed delivery contracts, or can be used when deciding how to use the successive ad impressions that prove to be available, for example when web page hits occur enabling the transmission of ad copy for insertion into the web page as rendered.

The disclosed allocation technique can incorporate functions that calculate the value of representativeness so as to rate the extent to which emerging ads meet advertiser representativeness specifications, e.g., functions that allow a comparison of ad impression characteristics and advertiser specifications as a measure of quality. Alternatively, the allocation can be based on an inferred monetary value based on the opportunity cost of employing an ad impression to meet a guaranteed demand. The opportunity cost is at least equal to the amount that the ad impression would bring in on the spot market. It is advantageous, however, to weight the importance of representativeness versus revenue, preferably to assume that a high degree of representativeness (high ad quality from the viewpoint of the advertiser) is a desired aspect for the ad distribution service to deliver. Weighting can be accomplished by a factor that favor representativeness or by choosing a proportion of revenue that should be attributable to representativeness, and thus contributes to long term customer goodwill.

Figure 8:
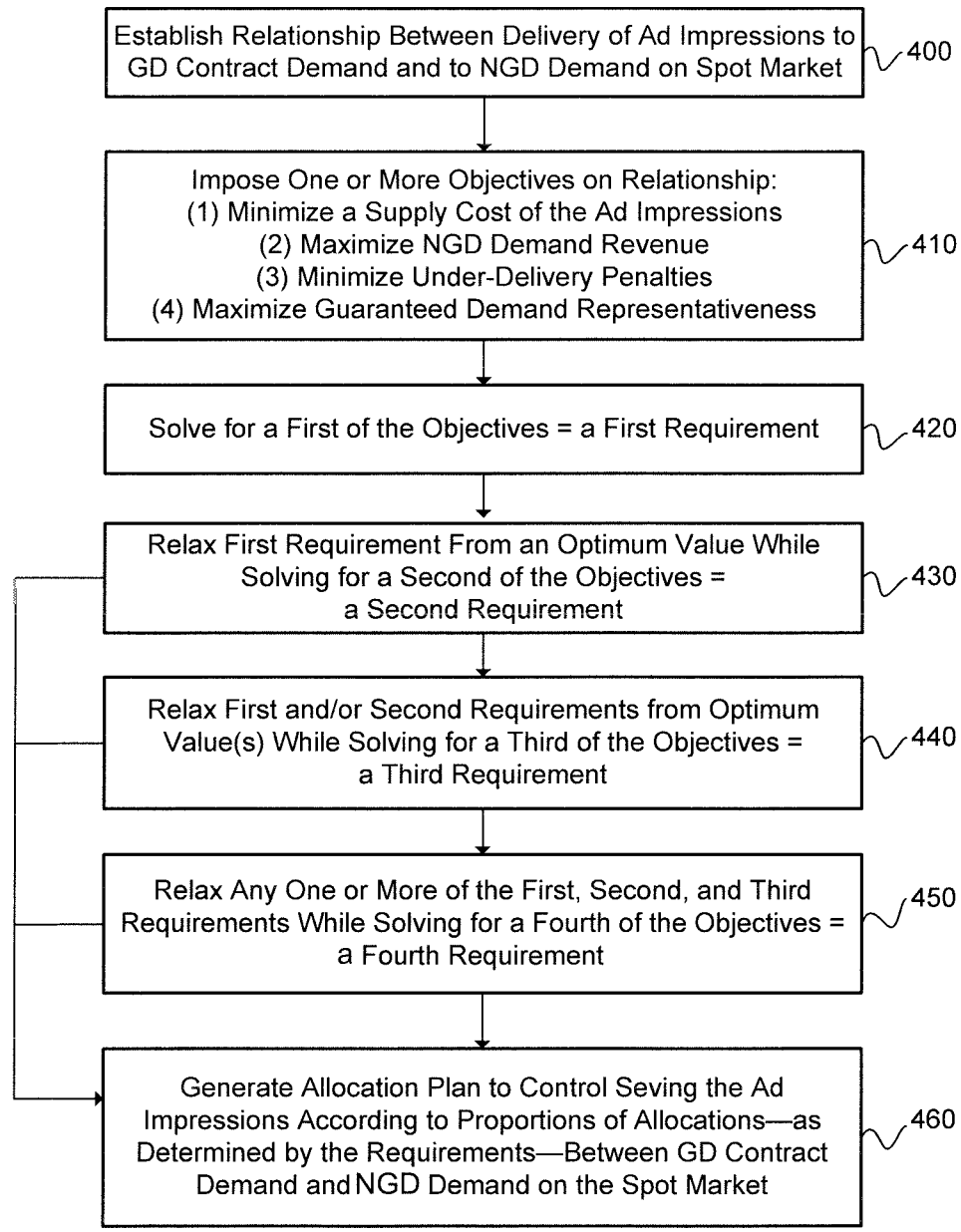
FIG. 8 is a flow chart of a method for distributing advertisement impressions through an exchange in which the number of ad impressions is changeable.

FIG. 8 is a flow chart of a method for distributing advertisement impressions through an exchange in which the number of ad impressions is changeable. At block 400, an ad delivery or distribution system establishes a relationship between delivery of ad impressions to guaranteed (GD) contract demand and to non-guaranteed (NGD) demand on an advertisement spot market, such as through an ad exchange auction. The relationship defines a range of possible proportions of allocation of the ad impressions between GD and NGD demand. At block 410, the system imposes one or more objectives on the relationship between allocation of ad impressions between GD and NGD demand. The objectives may include one or more of: (1) minimizing a supply cost of the ad impressions; (2) maximizing NGD demand revenue; (3) minimizing under-delivery penalties; and (4) maximizing guaranteed (GD) demand representativeness. Other objectives are envisioned.

To minimize the supply cost, the system may moderate an increase in the number of ad impressions available for allocation, to minimize a cost associated with reducing a quality of the ad impressions as their volume increases. By way of implementation, the number of ad impressions may be moderated when the ad impressions change based on one or more events. These events may include, but are not limited to: (1) changing a score threshold for qualifying a user into a specified interest category such as for behavioral targeting (BT) of users; (2) changing navigational links on a web page; and (3) dynamically changing displayed content on a web page. Other events are envisioned.

Ad distribution may be optimized through goal programming. At block 420, the system solves for a first of the objectives to generate a first requirement. At block 430, the system may relax the first requirement while solving for a second of the objectives to generate a second requirement. The second requirement therefore is affected by relaxing the first requirement. To relax a requirement may be viewed as the system allowing departure from its solved-for optimum value. Accordingly, relaxing a requirement that maximizes the objective is to allow the solved-for requirement to be less than the maximum value. In contrast, relaxing a requirement that minimizes the objective is to allow the solved-for requirement to be more than the minimum value.

At block 440, the system may relax the first and/or the second requirements while solving for a third of the objectives to generate a third requirement. The third requirement is therefore affected by relaxing the first and/or the second requirements. At block 450, the system may relax any one of the first, second, and/or third requirements while solving for a fourth of the objectives to generate a forth requirement. At block 460, the system may take the solved-for requirements from block 430, block 440, or block 450 to generate an allocation plan to control serving the ad impressions according to the range of possible proportions of allocations between the GD contract demand and the NGD demand on the spot market. The proportions of allocations may range anywhere from zero to 100%. The system may execute the method of FIG. 8 through an optimizer executing instructions stored in memory of a server. The system may also allow prioritization of the objectives and therefore solve for the objectives to generate the allocation plan in order of the prioritization.

This disclosure encompasses methods, systems for practicing the methods, programmable data processing apparatus and/or program data carriers that store code enabling a general purpose computer to practice the subject matter when coupled in data communication with sources of advertiser information, sources of media distributor information, and advertising copy that can be inserted when opportunities are reported by the media distributors.

FIG. 9 illustrates a practical embodiment as a block level diagram wherein the ad distribution system is configured as a computer system 750 that is coupled for data communications, for example to provide media in the form of HTML web pages and graphics files over a communication path traversing the Internet 755 to various remote users 757, who may be appropriate targets for advertising content provided by advertisers 200. The computer system 750 can be associated with a service such as a directory service or search engine, or a retail or wholesale outlet or any of various operations whose activities include transmission of media to users 757.

The system 750 as shown can include one or more processors 772, implemented using a general or special purpose processing engine such as a microprocessor, controller or other control logic configuration. In the example shown, processor 772 is coupled via a bus 780 to program and data memory 774, an interface 776 for input/output with a local operator, including, for example, a keyboard, mouse, display, etc., and a communications interface 778. The communications interface is generally shown coupled for communications with advertisers 200 or over the Internet with remote users 757; however it is likewise possible that other specific techniques could be employed to deliver data from the advertiser to system 750, such as hand transferred data carriers, telephone discussions or even paper exchanges. The manner of transmitting media to the users 757 likewise is not limited to web page data transmission and could comprise, for example, cable or other video program distribution among other possible embodiments.

The memory 774 of the computing system advantageously includes random access volatile memory and ROM, disc or flash nonvolatile memory for initialization. The program instructions are stored in and executed from the program memory to carry out the functions discussed above. The memory can include persistent data storage for accumulated data respecting advertiser and user information, for example on hard drives. Advantageously, the memory 774 of system 750 can contain locally stored versions of advertising copy that is to be inserted, especially for servicing guaranteed demand. The memory 774 also can receive, preferably store and insert at least some advertising copy from advertisers 22 who undertake to use ad impressions obtained on the ad hoc spot market.

Alternatively or in addition, at least part of the advertising copy to be inserted can be stored remotely and accessed by providing to the browser at the user system the appropriate URLs identifying advertising content to be inserted. For example, the system 750 can store and submit to the user browser a network address for graphics or other content to be inserted, which address refers to a system at or associated with the advertiser 200, which system is coupled for web communications and is configured to respond to an IP request for addressed graphic or media content. That content can be obtained by bidirectional IP communications between the browser and the system where the content is stored.

The persistent storage devices of memory 774 may include, for example, a media drive and a storage interface for video or other substantial storage capacity needs. The media drive can include a drive or other mechanism to support a storage media. For example, a hard disk drive, a floppy disk drive, a magnetic tape drive, an optical disk drive, a CD or DVD drive (R or RW), or other removable or fixed media drive may be employed. The storage media can include, for example, a hard disk, a floppy disk, magnetic tape, optical disk, a CD or DVD, or other fixed or removable medium that is read by and written to by the media drive.

The terms "computer program medium" and "computer useable medium" and the like are used generally to refer to media such as, for example, memory 774, various storage devices, a hard disk and hard disk drive and the like. These and other various forms of computer useable media may be involved in carrying one or more sequences of one or more instructions to the processor 772 for execution. Such instructions, generally referred to as "computer program code" (which may be grouped in the form of computer programs or other groupings), when executed, enable the computing system 750 to perform features or functions of the embodiments discussed herein.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

The network could be the Worldwide Web and the advertising copy could comprise banner ads, graphics in fields of specific size and placement, overlaid moving pictures or animation, redirection to a different URL, etc. The same targeting abilities are also applicable to networks that are interactive to a lesser degree, such as cable television ad insertion, which might be done at a head end or at a hub, or even from a subscriber-specific set top box.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure.

While one may not conclude definitely that any given subject (user or browser) responds favorably if exposed to information or advertising, for example by purchasing an advertised product or service, one can establish a set of variables to characterize members of a population, to determine values for those variables that are most characteristic of actual purchasers (and by implication to assess the quality of ad targets). The statistical methods above may enable correlation of a set of variable values with selected subsets of the population consistent with purchasers. Statistical methods also enable correlation among the variables themselves. The result is a set of criteria such as age, gender, location, income range, education, family status, etc., and various rules of thumb that attempt to use combinations of certain values of these criteria to make conclusions about the characteristics and buying preferences of customers.

Variably defined subsets of the population are thereby rated for the likelihood that members of each subset becomes a purchaser if exposed to advertising. The subsets of the population can be distinguished by the extent to which members are correlated to an ideal target for an advertising piece.

There are mathematical ways to correlate variable values that may be known about the population of subjects with other variable values that may not be known. There are also ways to infer information such as descriptive and demographic details about subjects, based on the subject's current activities, including the websites that a subject may be visiting, the entertainment programs being viewed, the periodical publications that the person reads, etc. If an advertiser is promoting a product that is associated with the content of a website or a publication, then advertising on the website or in the publication may be more valuable to the advertiser than advertising elsewhere or randomly, because the subjects who are exposed to the advertising are relatively more highly correlated with likely purchasers than other subjects and are more likely to actually see the advertising.

An advertiser typically does not have close access to an isolated population of subjects who are all very highly correlated with an ideal likely purchaser. Even if the advertiser had access to such a population, the advertiser may not devote 100% of its advertising effort to that population. The advertiser also may want to devote advertising efforts to other populations that are perhaps not so highly correlated, but where advertising still has a positive effect. For example, an advertiser may seek to spread advertising expenditures over a wide range of subjects and over a wide geographic area, while perhaps biasing its efforts toward subjects who are or might be correlated with a hypothetical ideal purchaser.

The advertiser may determine a profile of representative advertising over which advertising expenditures shall be devoted. This profile may be discussed with possible advertising outlets such as advertising brokers, advertising services (including on-line services such as that offered by Yahoo!), media outlets such as web page operators and cable media distributors, print publishers and others similarly situated. Negotiations may ensue on the basis that the party controlling the ad impressions demands payment and competing advertisers who want to use the ad impressions are willing to pay for the ad impressions in amounts that related to the extent to which the ad impressions match the advertisers' representative profiles of what the advertisers demand. Matching the use of impressions to adhere to the representative aspects sought by the advertiser may be an objective. Maintaining "representativeness" may achieve long term value.

The market for advertising on Internet web pages is particularly well developed because information is available to characterize the web page users (the potentially targeted subjects). Infrastructure is in place for changeably inserting ad graphics and moving pictures, such as Internet browsers. Data from click streams and sometimes from locally stored cookies can carry context and history information forward in time as the user surfs through different pages. Internet service providers make at least generalized information on subscribers available routinely, such as the subscriber's zip code. These information sources enable information to be collected to gauge the characteristics of users and enable an advertiser to define a representative advertising allocation for which the advertiser contracts.

Internet web page operators are also in a good situation for collecting data about information distribution events, such as reporting on the availability and use of ad impressions. Executed ad impressions can be counted and reported with associated context information, time of day, location of recipient and so forth. This information enables the operators to forecast the number of impressions and the characteristics of users that are likely to be available to receive impressions ready to be allocated to those users at a future date and time. The information allows up to the moment monitoring of use of the ad impressions for reporting compliance with contractual obligations to distribute a given number of ads of a given type in a given time window.

Advertisers contract with advertising distributors and advertising services to make use of ad impressions that are available to the distributor or service. The advertising distributor might be a website operator or an advertising warehouse that in turn contracts with website operators. Available impressions may be determined in number and with respect to attributes that determine the value of the impressions to the advertiser. The attributes include characteristics that enable the advertiser to judge how representative the recipients of the impressions will be, compared to likely purchasers and to the advertiser's desired profile of ad distribution. The advertising distributor may agree to distinguish among potential users to whom impressions are delivered, for example by the attributes of the users or the web content that the users view. This aspect may be written into the contract. The advertising distributor may commit to delivering a given number of impressions to users of defined characteristics or in a defined context over a given time window at some point in the future.

The advertiser may contract with the advertising distributor to deliver a stated number of ad impressions to a stated number of website viewers having stated demographic or other properties that correspond with the representativeness aspects dictated by an advertiser. There may be alternative ways in which the website operator could meet its obligations. As one example, if the agreement is to deliver impressions to users in a certain age group, the website operator might devote a large ratio of available impression opportunities at a time of day when the on-line user population of the age group is low, or a smaller ratio of available impression opportunities at a time of day when the percentage of users in that age group is higher, and in either case get the number of impressions needed to meet the contractual obligation.

The website operator or other advertising distributor has degrees of freedom in which to operate but may need information to define the variations in users by factors that matter, such as the correlation of user age to time of day of on-line access, in the example of a time discrimination aspect. There are various such correlations possible between category ratings that are known or might be inferred.

In order to assess its ability to meet contractual obligations, the advertising distributor projects an estimate of the number of users of given characteristics at some future date and time when offering to sell ad impressions to an advertising campaign manager negotiating for the advertiser. If the seller of ad impressions (the advertising distributor) guarantees that a certain number of ad impressions are executed to users of given attributes, the seller may be bound to comply, subject to possible contractual penalties.

A seller may decide to guarantee a number of available impressions that are relatively sure to be available at the future data and time. Then if an excess number of impressions actually become available for execution at that time, the seller may seek to exploit them in sales under short term contracts, in an ad hoc spot market or by auction that could occur at any time up to the moment that an ad impression is used. The impressions that were committed by contract according to prudent projections made ahead of time can be deemed "guaranteed" impressions. The remaining impressions are "excess" or "non-guaranteed" impressions and may be sold on last minute terms or on "best efforts" commitments by the ad distributor.

In existing markets for on-line advertising, the manner of sale and the use of guaranteed and non-guaranteed ad impressions may be distinctly different for the two types. Based on their confidence in projections of ad availability, the seller of ad impressions may prefer to sell guaranteed impressions and to develop long term relationships with advertisers characterized by dependability in meeting obligations. However, undue caution when making projections may leave saleable ads unsold, or may affect the prices that quality ad impressions may command. Furthermore, the ability to correlate user characteristics with ad impressions accurately may be best immediately before the ads are used. Therefore, some of the highest quality ads (namely those that are highly correlated with some desired target category) arise only after it is too late to handle them in guaranteed contracts. For these impressions, a second marketplace is advantageous, apart from the marketplace in the sale of projected future impressions under contracts that contain obligations as to the number of impressions that provided. This second marketplace is not based substantially on promises of future performance and instead is based on exploiting currently available opportunities.

If the advertising distributor was cautious when negotiating contracts to sell guaranteed impressions, the advertising distributor may have reserved a substantial portion of the impressions that were projected to become available, to avoid contractual penalties if the projections prove too optimistic. These may be sold or else wasted.

If impressions become available that are matched to an advertiser's representative profile, the impressions have a high value in advertising effectiveness to that advertiser. These non-guaranteed impressions might be sold at a high price. Assuming that some proportion of projected impressions are to be reserved to ensure the ability to meet obligations, a problem is presented in how optimally to allocate the impressions between the guaranteed and non-guaranteed categories when planning and negotiating contracts for use of projected future ad impressions. Assuming that the decisions have been made, the situation may change when projections are proved or disproved in reality. The above system and method, including optimizer 310, may optimally allocate emergent supply of ad impressions either to obligated/guaranteed impressions or to non-guaranteed impressions, in a manner that is agile and quick.

The system and method may consider multiple objectives. The advertising distributor meets his contractual obligations, and delivers quality impressions to the advertiser in exchange for value received. The advertising distributor's long term performance under these objectives, including meeting contractual obligations for delivery of guaranteed impressions, is important to maintaining mutually beneficial relations between the advertising distributor and its customers, namely the advertisers.

The advertising distributor may maximize revenues obtained in exchange for use of the ad impressions that are available. Revenues can be maximized when accurate projections can be made, including forecasting the supply of impressions that are available, assessing the demand for guaranteed impressions and forecasting the future demand in the event of short notice ad hoc sales of excess impressions, by auction or otherwise.

The foregoing situation can be considered a confluence of overlapping marketplaces. For each marketplace, the impressions (information exposures) that are available according to projections, or the impressions that actually prove to be available when the time arrives, each represent a finite supply of information distribution opportunities. These information distribution opportunities need to be allocated to the demand for use of ad impression opportunities associated with highly representative advertiser-targeted groups. The allocation may maximize representativeness of ad impressions compared to the advertiser's targeting, which comes from ensuring that guaranteed impressions are faithfully delivered. The allocation may maximize the revenue to the advertising distributor, who may be a media operator, by ensuring that no impressions go unsold, or are sold at prices that are less than the ad impressions should reasonably command.

A given number of impressions is projected to be available. If the advertising distributor decides to use some number of the projected impressions under guaranteed contracts, then the number available for ad hoc auction is reduced, and vice versa. The above system and method may provide an optimal and efficient technique to control the relative allocations of guaranteed ad impressions under contracts versus non-guaranteed ad impressions to be sold on the spot market.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. An advertisement impression distribution system, comprising:
    a data processing system including a processor and memory,
    the data processing system programmed to generate, as goal programming, an allocation plan for serving a number of advertisement impressions eligible to meet a demand of a plurality of advertisers, the allocation plan to allocate a first portion of advertisement impressions to satisfy guaranteed demand arising from pre-arranged contracts and a second portion of advertisement impressions to satisfy non-guaranteed demand auctioned in real time in an advertisement spot market, as the advertisement impressions become available,
    where the guaranteed and non-guaranteed demands comprise competing demands for advertisement impressions having overlapping targeting attributes that target features matching advertiser targeting profiles in a high-dimensional targeting space, and the number of advertisement impressions are changeable as a result of one or more events;
    where the data processing system includes an optimizer, the optimizer programmed to:
        establish a relationship between the first portion of advertisement impressions and the second portion of advertisement impressions, the relationship defining a range of possible proportions of allocation of the first portion of advertisement impressions and the second portion of advertisement impressions; and
        impose multiple objectives on the relationship, comprising:
            maximizing guaranteed demand representativeness through proportionate allocation of advertisement impressions to advertisers with advertisements containing attributes matching the impressions; and
            moderating an increase in the number of advertisement impressions available for allocation to the first and second portions, to minimize a cost associated with reducing a quality of the advertisement impressions as a volume of the advertisement impressions increases;
        solve for a first of the objectives, resulting in a first requirement, then solve for a second of the objectives to generate a second requirement while relaxing the first requirement, where relaxing is to allow departure from a determined optimum value;

where the data processing system is further programmed to output the allocation plan to an ad serving module of the data processing system to control serving of the advertisement impressions according to the range of possible proportions of allocation between the first and the second portions.

2. The system of claim 1, where the one or more events that cause the advertisement impressions to change comprise one or more of:
changing a score threshold for qualifying a user into a specified interest category;
changing navigational links on a web page; and
dynamically changing displayed content on a web page;
where the interest category depends on user behavior, and where the cost of the advertisement impressions comprises a cost associated with a function that increases with an increase in the number of advertisement impressions.

3. The system of claim 1, where the multiple objectives further comprise: maximizing non-guaranteed demand revenue from non-guaranteed contracts of advertisers, and minimizing under-delivery penalties that result from not fulfilling guaranteed contract delivery requirements.

4. The method of claim 3, where the first requirement comprises a minimum penalty cost and the second requirement comprises a maximum non-guaranteed demand revenue, and where relaxing the first requirement comprises allowing the first requirement to be greater than the solved minimum penalty cost.

5. The method of claim 3, where the optimizer is further programmed to:
solve a third objective to generate a third requirement while relaxing one or more of the first and second requirements.

6. The system of claim 5, where the first requirement comprises a maximum non-guaranteed demand revenue, the second requirement comprises a minimum penalty cost, and the third requirement comprises a maximum guaranteed demand representativeness, and where relaxing the one or more of the first and second requirements comprises one or more of:
allowing the first requirement to be less than the solved maximum non-guaranteed demand revenue; and
allowing the second requirement to be greater than the solved minimum penalty cost.

7. The system of claim 5, further comprising:
solving a fourth objective to generate a fourth requirement while relaxing one or more of the first, second, and third requirements.

8. The system of claim 7, where the first, second, and third requirements comprise a minimum penalty cost, a maximum non-guaranteed demand revenue, and a minimum supply cost of the advertising impressions in any order, and where the fourth requirement comprises a maximum guaranteed demand representativeness.

9. The system of claim 8, where the first through fourth objectives are ordered according to priority and the highest priority objective is solved first.

10. The system of claim 3, where the optimizer is further programmed to:
combine the under-delivery penalties, the non-guaranteed demand revenue, and the supply cost of the advertisement impressions using a weighted sum of monetary objectives, the method further including:
first optimizing the monetary objectives; and
next optimizing the guaranteed demand representativeness.

11. A method for distributing advertisement impressions, the method executable by a data processing system having a processor and memory, and in the memory stored instructions, comprising:
generating, with the system through execution of the instructions and as goal programming, an allocation plan for serving a number of advertisement impressions eligible to meet a demand of a plurality of advertisers, the allocation plan to allocate a first portion of advertisement impressions to satisfy guaranteed demand arising from pre-arranged contracts and a second portion of advertisement impressions to satisfy non-guaranteed demand auctioned in real time in an advertisement spot market, as the advertisement impressions become available,
where the guaranteed and non-guaranteed demands comprise competing demands for advertisement impressions having overlapping targeting attributes that target features matching advertiser targeting profiles in a high-dimensional targeting space, and the number of advertisement impressions being changeable as a result of one or more events, where generating comprises:
establishing a relationship between the first portion of advertisement impressions and the second portion of advertisement impressions, the relationship defining a range of possible proportions of allocation of the first portion of advertisement impressions and the second portion of advertisement impressions; and
imposing multiple objectives on the relationship, comprising:
maximizing guaranteed demand representativeness through proportionate allocation of advertisement impressions to advertisers with advertisements containing attributes matching the impressions; and
moderating an increase in the number of advertisement impressions available for allocation to the first and second portions, to minimize a cost associated with reducing a quality of the advertisement impressions as a volume of the advertisement impressions increases;
solving for a first of the objectives, resulting in a first requirement, followed by solving for a second of the objectives to generate a second requirement while relaxing the first requirement, where relaxing is to allow departure from a determined optimum value; and
outputting the allocation plan to an ad serving module of the system through execution of the instructions, to control serving of the advertisement impressions according to the range of possible proportions of allocation between the first and the second portions.

12. The method of claim 11, where the one or more events that cause the advertisement impressions to change comprise one or more of:
changing a score threshold for qualifying a user into a specified interest category;
changing navigational links on a web page; and
dynamically changing displayed content on a web page;
where the interest category depends on user behavior, and where the cost of the advertisement impressions comprises a cost associated with a function that increases with an increase in the number of advertisement impressions.

13. The method of claim 11, where the multiple objectives further comprise: maximizing non-guaranteed demand revenue from non-guaranteed contracts of advertisers, and minimizing under-delivery penalties that result from not fulfilling guaranteed contract delivery requirements.

14. The method of claim 13, where the first requirement comprises a minimum penalty cost and the second requirement comprises a maximum non-guaranteed demand revenue, and where relaxing the first requirement comprises allowing the first requirement to be greater than the solved minimum penalty cost.

15. The method of claim 13, further comprising:
solving a third objective to generate a third requirement while relaxing one or more of the first and second requirements.

16. The method of claim 15, where the first requirement comprises a maximum non-guaranteed demand revenue, the second requirement comprises a minimum penalty cost, and the third requirement comprises a maximum guaranteed demand representativeness, and where relaxing the one or more of the first and second requirements comprises one or more of:
allowing the first requirement to be less than the solved maximum non-guaranteed demand revenue; and
allowing the second requirement to be greater than the solved minimum penalty cost.

17. The method of claim 15, further comprising:
solving a fourth objective to generate a fourth requirement while relaxing one or more of the first, second, and third requirements.

18. The method of claim 17, where the first, second, and third requirements comprise a minimum penalty cost, a maximum non-guaranteed demand revenue, and a minimum supply cost of the advertising impressions in any order, and where the fourth requirement comprises a maximum guaranteed demand representativeness.

19. The method of claim 17, where the first through fourth objectives are ordered according to priority and the highest priority objective is solved first.

20. The method of claim 13, further comprising:
combining the under-delivery penalties, the non-guaranteed demand revenue, and the supply cost of the advertisement impressions using a weighted sum of monetary objectives, the method further including:
first optimizing the monetary objectives; and
next optimizing the guaranteed demand representativeness.

* * * * *